United States Patent
Anderegg et al.

(10) Patent No.: US 11,270,500 B2
(45) Date of Patent: *Mar. 8, 2022

(54) METHODS AND SYSTEMS FOR USING DIRECTIONAL OCCLUSION SHADING FOR A VIRTUAL OBJECT MODEL

(71) Applicant: Verizon Patent and Licensing Inc., Basking Ridge, NJ (US)

(72) Inventors: Bradley G. Anderegg, Glen Gardner, NJ (US); Oliver S. Castaneda, Rochester, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/943,642

(22) Filed: Jul. 30, 2020

(65) Prior Publication Data

US 2020/0357168 A1 Nov. 12, 2020

Related U.S. Application Data

(63) Continuation of application No. 16/286,967, filed on Feb. 27, 2019, now Pat. No. 10,762,697.

(51) Int. Cl.
*G06T 15/80* (2011.01)
*G06T 17/00* (2006.01)
*G06T 15/04* (2011.01)

(52) U.S. Cl.
CPC .............. *G06T 15/80* (2013.01); *G06T 15/04* (2013.01); *G06T 17/00* (2013.01)

(58) Field of Classification Search
None
See application file for complete search history.

(56) References Cited

U.S. PATENT DOCUMENTS

| | | | |
|---|---|---|---|
| 7,825,937 B1 | 11/2010 | Sakhartchouk et al. | |
| 10,380,803 B1 | 8/2019 | Jaafar et al. | |
| 10,553,013 B2 | 2/2020 | Hunt et al. | |
| 2014/0125668 A1 | 5/2014 | Steed et al. | |
| 2015/0262412 A1 | 9/2015 | Gruber et al. | |
| 2015/0279113 A1 | 10/2015 | Knorr et al. | |
| 2016/0035134 A1* | 2/2016 | Tanaka | G06F 3/00 345/633 |
| 2016/0247314 A1 | 8/2016 | Park et al. | |
| 2017/0193690 A1 | 7/2017 | Ha et al. | |

OTHER PUBLICATIONS

Papaioannou Georgios, Maria Lida Menexi, and Charilaos Papadopoulos. "Real-time volume based ambient occlusion." IEEE Transactions on Visualization and Computer Graphics 16.5 (2010): 752-762 (Year: 2010).*
Green, "Efficient self-shadowed radiosity normal mapping", In ACM SIGGRAPH 2007 courses Aug. 5, 2007 (pp. 1-8). (Year: 2007).

* cited by examiner

*Primary Examiner* — Nurun N Flora

(57) ABSTRACT

An exemplary object modeling system determines a set of directional occlusion values associated with a surface point on a surface of a virtual object. The directional occlusion values are representative of an exposure of the surface point to ambient light from each direction of a set of directions defined by a radiosity basis. The object modeling system also stores the set of directional occlusion values as part of texture data defining the surface point and provides the texture data that includes the set of stored directional occlusion values associated with the surface point. Corresponding methods and systems are also disclosed.

20 Claims, 11 Drawing Sheets

Texture Data for Virtual Object 402

| Surface Point | Directional Occlusion Value A | Directional Occlusion Value B | Directional Occlusion Value C |
|---|---|---|---|
| | | Directional Occlusion Value Sets | |
| 408-1 | 0% | 0% | 0% |
| 408-2 | 70% | 0% | 0% |
| 408-3 | 0% | 45% | 45% |
| 408-4 | 0% | 45% | 45% |
| 408-5 | 0% | 45% | 45% |
| Other surface points . . . | . . . | . . . | . . . |

Fig. 5

METHODS AND SYSTEMS FOR USING DIRECTIONAL OCCLUSION SHADING FOR A VIRTUAL OBJECT MODEL

RELATED APPLICATIONS

This application is a continuation application of U.S. patent application Ser. No. 16/286,967, filed Feb. 27, 2019, and entitled "Directional Occlusion Methods and Systems for Shading a Virtual Object Rendered in a Three-Dimensional Scene," which is hereby incorporated by reference in its entirety.

BACKGROUND INFORMATION

In various scenarios, an extended reality system that implements one or more types of extended reality technology (e.g., augmented reality technology, virtual reality technology, etc.) may be configured to render a virtual object in a three-dimensional ("3D") scene. For example, in certain implementations of augmented reality technology, a virtual object may be rendered so as to appear to be part of the real world (e.g., at a location proximate to a user experiencing the augmented reality technology). As another example, in certain implementations of virtual reality technology, a virtual object may be rendered so as to appear to be part of a virtual reality world (e.g., an imaginary virtual world, a camera-captured virtual world that is generated based on a real world location such as a location separate from where the user is experiencing the virtual reality technology, etc.).

To render a virtual object convincingly within a particular 3D scene (i.e., to render the virtual object in a manner that makes the virtual object appear to be a real object or to appear to actually be integrated with other real or virtual objects in the 3D scene), it may be desirable for an extended reality system to account for various details. For instance, it may be desirable for the extended reality system to account for various sources of light in the 3D scene and how this light interacts with the geometry of the surface of the virtual object.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 5 illustrates exemplary texture data representative of respective sets of directional occlusion values for exemplary surface points of the virtual object of FIGS. 4A and 4B according to principles described herein.

DETAILED DESCRIPTION OF PREFERRED EMBODIMENTS

Figure 1:
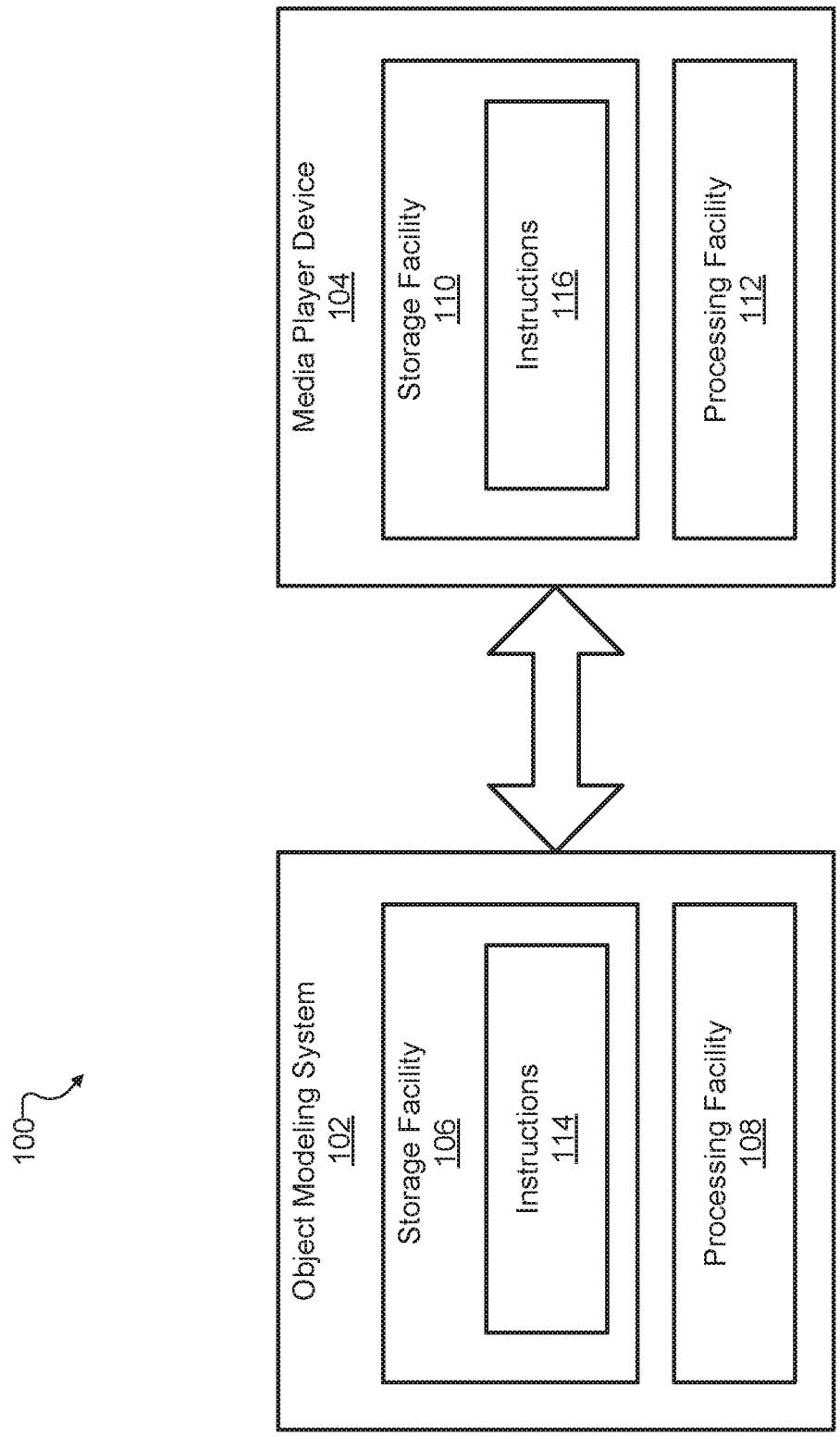
FIG. 1 illustrates an exemplary directional occlusion system that includes an exemplary object modeling system communicatively coupled with an exemplary media player device for shading a virtual object rendered in a 3D scene according to principles described herein.

Directional occlusion methods and systems for shading a virtual object rendered in a 3D scene are described herein. More particularly, directional occlusion methods and systems described herein facilitate the generation of extremely authentic and realistic looking shadows and surface shading by not only accounting for occlusion of light originating from point sources (e.g., the sun, a light bulb in a room, etc.) but also accounting for light originating from ambient sources (e.g., the sky on an overcast day, light streaming in from a large window and reflecting off walls in a room, etc.). More specifically, methods and systems described herein account for ambient light based on a general direction from which the ambient light originates with respect to the orientation of each surface point on a virtual object.

For example, one embodiment of a directional occlusion system for shading a virtual object rendered in a 3D scene may include an object modeling system communicatively coupled with a media player device configured to render a virtual object within a 3D scene as part of an extended reality presentation (e.g., an augmented reality presentation, a virtual reality presentation, a mixed reality presentation, etc.).

The exemplary object modeling system in this embodiment may access a model of the virtual object to be integrated into the 3D scene. In some examples, the model accessed by the system may include texture data defining a plurality of surface points on a surface of the virtual object. For each surface point of the plurality of surface points, the object modeling system may determine and store a respective set of directional occlusion values associated with the surface point. More particularly, the object modeling system may determine directional occlusion values representative of an exposure of the surface point to ambient light from each direction of a set of directions defined by a radiosity basis, and may store (e.g., as part of the texture data defining the surface point within the model) the respective set of directional occlusion values associated with the surface point.

Along with determining and storing the respective sets of directional occlusion values, the object modeling system may also generate a set of directional irradiance maps comprising irradiance data representative of ambient light in the 3D scene. For example, each directional irradiance map in the set of directional irradiance maps may be associated with (e.g., may be generated so as to correspond to) a different direction of the set of directions defined by the radiosity basis. As used herein, "ambient light" may refer broadly to any light represented in an irradiance map such as the directional irradiance maps described herein. For example, ambient light may refer to any of various types of light that may be captured by an irradiance capture device (e.g., an irradiance camera) from any of various sources in the 3D scene including, but not limited to, directional light sources, area light sources, specular light sources, and so forth. As such, ambient light may include direct light, indirect light, natural light, artificial light, and/or any other type of light that may be present in the 3D scene.

Based on the operations described above, the object modeling system may provide the set of directional irradiance maps and the model of the virtual object comprising the texture data that includes the respective sets of stored directional occlusion values associated with each surface point of the plurality of surface points. For example, the object modeling system may provide the directional irradiance maps and the model of the virtual object to the media player device configured to render the virtual object within the 3D scene for presentation to a user of the media player device.

Accordingly, the media player device communicatively coupled to the object modeling system in this example may receive the model of the virtual object and the set of directional irradiance maps from the object modeling system. Specifically, the media player device may receive the model that, as mentioned above, may include texture data representative of respective sets of directional occlusion values associated with each surface point of the plurality of surface points on the surface of the virtual object. Additionally, the media player device may receive the set of directional irradiance maps that, as mentioned above, may include irradiance data representative of ambient light in the 3D scene.

Based on the model of the virtual object and the set of directional irradiance maps received, the media player device may render the virtual object such that the virtual object appears, to the user of the media player device, to be integrated into the 3D scene. As mentioned above, one advantage of the methods and systems described herein is that this rendering may include adding shadows and shading to the object surfaces that look extremely realistic because not only are point light sources accounted for in a manner that respects the directionality from which light originates, but ambient light originating from various directions and sources within the space (e.g., originating from each wall in a room, originating from the entire sky in an outdoor setting, etc.) is also accounted for in a directional way. Specifically, in addition to accounting for the directionality of unobstructed light from point sources (e.g., by drawing shadows in a conventional manner), methods and systems described herein further account for the directionality of obstructed or reflected ambient light (e.g., sunlight obstructed by tall buildings or clouds in the sky, indoor lighting reflecting from walls and other surfaces in a room, etc.) to create realistic shading of the virtual object surfaces. By including such realistic shading, the virtual object (and, more broadly, the entire 3D scene presented to the user) may appear more realistic and immersive, thereby making the user's extended reality experience more enjoyable and meaningful than it might otherwise be without such realism.

Realistic shading of virtual object surfaces to account for lighting present in a particular 3D scene is the focus of many specific examples and disclosure contained herein. However, it will be understood that the same or similar principles described herein for shading a virtual object to account for lighting within the 3D scene may likewise be applied to realistically shade other objects within the 3D scene to account for effects of the virtual object. For example, just as luminosity, color, color balance, shading, and/or other aspects of the appearance of a virtual object may be affected by how light reflects from surfaces of other surfaces in the 3D scene, the luminosity, color, color balance, shading, and/or other aspects of the appearance of the other surfaces in the 3D scene may similarly be affected by how light reflects from surfaces of the virtual object.

Directional occlusion methods and systems described herein may improve the user's extended reality experience by providing the advantages described above and/or other benefits and advantages. For example, because ambient light originating from different directions may be different colors (e.g., in a room where different walls reflecting ambient light are painted different colors, during a sunset where eastern sky is blue and western sky is orange, etc.), methods and system described herein may generate lifelike and accurate object renderings by creating shading and shadows that are a realistic color. This is an improvement over shading and shadows produced by conventional shading techniques that merely darken the colors of objects without regard for directional ambient light color. Moreover, by accounting for ambient light in a directional manner (rather than treating all ambient light from all directions equally), realistic light propagation may be more realistically modeled to create a closer approximation of physical reality.

Because the determination of directional occlusion values for each surface point on a virtual object can be performed independently from the generation of directional irradiance maps representative of ambient light in the 3D scene in the methods and systems described herein, these tasks can be distributed to different computing platforms appropriate for performing each task. For instance, as will be described in more detail below, a network-edge-deployed server with a relatively large amount of computing resources may be configured to predetermine (e.g., prior to render time) the directional occlusion values for each surface point of a virtual object and to store those directional occlusion values in texture data associated with the virtual object. At or before render time as may be desired for a certain implementation, directional irradiance maps representative of the ambient light in the 3D scene may also be generated by a dedicated system component.

At render time, a media player device may then render the virtual object with highly realistic shading based on this data that has already been independently determined and provided. Unlike in conventional setups, this rendering performed by the media player device does not require computationally-expensive, real-time raytracing or other complex calculations because these calculations are unnecessary in view of the calculations that have already been performed ahead of time (e.g., prior to render time). Using this novel paradigm, the media player device is only required to perform relatively simple calculations at render time to produce a final, highly-realistic rendering.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary directional occlusion system 100 ("system 100") that includes an exemplary object modeling system 102 communicatively coupled with an exemplary media player device 104 for shading a virtual object rendered in a 3D scene according to principles described herein. While both object modeling system 102 and media player device 104 are shown to be separate entities in FIG. 1, it will be understood that, in certain embodiments, object modeling system 102 and media player device 104 may be integrated into a single entity (e.g., by object modeling system 102 being implemented by the hardware and/or software of media player device 104, or vice versa). Additionally, while both object modeling system 102 and media player device 104 are shown to be included in the implementation of system 100 shown in FIG. 1, it will be understood that certain implementations of system 100 may include only an object modeling system or a media player device, but not both, while other implementations of system 100 may include additional components not explicitly shown in FIG. 1. As such, it will be understood that operations performed by object modeling system 102, by media player device 104, and/or by a combination of both of these and/or other components of system 100, will be referred to herein as being performed by system 100.

A communicative interface between object modeling system 102 and media player device 104 may represent any type of interface that may be included within or employed by system 100. For example, as will be described in more detail below, object modeling system 102 and media player device 104 may communicate by way of one or more elements of a network or other communicative interface.

As depicted in FIG. 1, object modeling system 102 may include, without limitation, a storage facility 106 and a processing facility 108 selectively and communicatively coupled to one another. Facilities 106 and 108 may each include or be implemented by hardware and/or software components (e.g., processors, memories, communication interfaces, instructions stored in memory for execution by the processors, etc.). In some examples, facilities 106 and 108 may be distributed between multiple devices and/or multiple locations as may serve a particular implementation.

Similarly, as shown, media player device 104 may include, without limitation, a storage facility 110 and a processing facility 112 selectively and communicatively coupled to one another. As with facilities 106 and 108 described above, facilities 110 and 112 may each include or be implemented by any suitable hardware and/or software components, and, in some examples, may be distributed between multiple devices and/or multiple locations as may serve a particular implementation.

In some implementations, system 100 may be configured to shade a virtual object rendered in a 3D scene in real time. As used herein, a function may be said to be performed in real time when the function relates to or is based on dynamic, time-sensitive information (e.g., data representative of current ambient light present within a 3D scene, data representative of a pose of a virtual object with respect to other real or virtual objects within a 3D scene, etc.) and the function is performed while the time-sensitive information remains accurate or otherwise relevant. Due to processing times, communication latency, and other inherent delays in physical systems, certain functions may be considered to be performed in real time when performed immediately and without undue delay, even if performed with some latency (e.g., after a small delay).

Even as rendering and shading may be performed in real time, however, it will be understood that other operations performed by system 100 (e.g., including operations that allow for the real time nature of the operations described above) may not be performed in real time, but, rather, may be performed independently ahead of time. For example, as mentioned above and as will be described in more detail below, texture data for a model of a virtual object, including directional occlusion values for each surface point on the virtual object that may be stored as part of the texture data, may be determined ahead of time (i.e., prior to render time). In this way, rendering operations performed by system 100 (e.g., by media player device 104) may be performed in real time because the amount of real-time processing required to render accurate shadows and shading is reduced.

Each of the facilities of object modeling system 102 and media player device 104 within system 100 will now be described in more detail. Storage facilities 106 and 110 may each maintain (e.g., store) executable data used by processing facilities 108 and 112, respectively, to perform any of the functionality described herein. For example, storage facility 106 may store instructions 114 that may be executed by processing facility 108 and storage facility 110 may store instructions 116 that may be executed by processing facility 112. Instructions 114 and/or instructions 116 may be executed by facilities 108 and/or 112, respectively, to perform any of the functionality described herein. Instructions 114 and 116 may be implemented by any suitable application, software, code, and/or other executable data instance. Additionally, storage facilities 106 and/or 110 may also maintain any other data received, generated, managed, used, and/or transmitted by processing facilities 108 or 112 as may serve a particular implementation.

Processing facility 108 may be configured to perform (e.g., execute instructions 114 stored in storage facility 106 to perform) various data and signal processing functions associated with creating and otherwise accessing data to be used to shade a virtual object rendered in a 3D scene, and providing this data to media player device 104. For example, processing facility 108 may be configured to access a model of a virtual object to be integrated into a 3D scene such as a real-world scene (e.g., the real-world environment within which a user is located during an augmented reality experience) or a virtual scene (e.g., a virtualized or camera-captured virtual scene within which an avatar of a user is located during a virtual reality experience). The model of the virtual object may include texture data defining various aspects of the texture (e.g., color, appearance, surface geometry, etc.) of the virtual object. For example, the texture data may define the texture of a plurality of surface points on a surface of the virtual object.

Processing facility 108 may perform certain operations with respect to each surface point of the plurality of surface points on the surface of the virtual object. These operations may be performed sequentially or in parallel and, as mentioned above, may be performed near or prior to render time by components of processing facility 108 that are associated with ample computing resources (e.g., parallel processors in a network-edge-deployed server or another server system managed by a service provider or the like). The operations performed for each surface point of the plurality of surface points may include determining and storing a respective set of directional occlusion values for that surface point. For example, processing facility 108 may determine a respective set of directional occlusion values associated with each surface point where the directional occlusion values represent an exposure of the surface point to ambient light from each direction of a set of directions defined by a radiosity basis. The set of directions defined by the radiosity basis may include any suitable number of directions, with the understanding that as more directions are accounted for by the radiosity basis, more processing will be required to determine the directional occlusion values. As such, in certain examples, the set of directions may include three directions that are orthogonal to another so as to form a spatial coordinate system whose origin is located at the surface point. In other examples, more or fewer sets of directions may be used. Upon determining the set of directional occlusion values for a particular surface point, processing facility 108 may store, as part of the texture data defining the particular surface point within the model, the respective set of directional occlusion values associated with the particular surface point. Exemplary directional occlusion values and an exemplary radiosity basis will be illustrated and described in more detail below.

Independently from the determining and storing of the respective sets of directional occlusion values for each of the surface points of the virtual object, processing facility 108 may also generate a set of directional irradiance maps that includes irradiance data representative of ambient light in the 3D scene. For example, the set of directional irradiance maps may be generated prior to render time (e.g., concurrently with the determining and storing of the respective sets of directional occlusion values) or at render time (e.g., concurrently with the rendering of the virtual object in the 3D scene). In some examples, the set of directional irradiance maps may be continuously updated (e.g., in real time) as ambient lighting conditions in the 3D scene change over time. As such, processing facility 108 may include or have access to an image sensor (e.g., a 360° or spherical camera sensor) located at the 3D scene and continuously capturing data representative of the ambient lighting conditions at the 3D scene. Each directional irradiance map in the set of directional irradiance maps may be generated to be associated with a different direction of the set of directions defined by the radiosity basis. Thus, for example, if the radiosity basis includes three directions such as described above, the set of directional irradiance maps may include three directional irradiance maps, one associated with each of the three directions. Exemplary directional irradiance maps will be illustrated and described in more detail below.

Upon determining and storing all of the respective sets of directional occlusion values within the texture data of the model and generating the set of directional irradiance maps, processing facility 108 may provide this data to media player device 104 to allow media player device 104 to render the virtual object within the 3D scene for presentation to the user of the media player device. For example, processing facility 108 may provide the set of directional irradiance maps and the model of the virtual object comprising the texture data that includes the respective sets of stored directional occlusion values by way of the communicative interface (e.g., a network) that is shown to couple object modeling system 102 and media player device 104.

Referring now to media player device 104, media player device 104 may be configured to receive data and render virtual objects with highly-accurate shadows and shading in a 3D scene for an extended reality experience engaged in by the user of media player device 104. For example, by executing instructions 116 stored within storage facility 110, processing facility 112 may be configured to receive data and instruction from object modeling system 102 to render the virtual object in a beneficial manner to the user experiencing the extended reality in the 3D scene. For example, processing facility 112 may receive (e.g., from object modeling system 102 over the communicative interface) the model of the virtual object to be integrated into the 3D scene. As described above, the model received from object modeling system 102 may include texture data representative of respective sets of directional occlusion values associated with each surface point of the plurality of surface points on the surface of the virtual object, and, for each surface point of the plurality of surface points, the directional occlusion values within the respective set of directional occlusion values associated with the surface point may be representative of the exposure of the surface point to ambient light from each direction of the set of directions defined by the radiosity basis.

Processing facility 112 may further receive (e.g., from object modeling system 102 over the communicative interface) the set of directional irradiance maps for the 3D scene. As described above, the set of directional irradiance maps may include irradiance data representative of ambient light in the 3D scene, and each directional irradiance map in the set of directional irradiance maps may be associated with a different direction of the set of directions defined by the radiosity basis.

Based on the model of the virtual object and the set of directional irradiance maps received from object modeling system 102, processing facility 112 may render the virtual object in a realistic manner (e.g., with highly realistic looking shadows, shading, etc., as described above) for the user of media player device 104 engaging in the extended reality experience of the 3D scene. Specifically, for example, processing facility 112 may perform the rendering such that the virtual object appears to the user to be integrated into the 3D scene in a natural and realistic way.

Figure 2:
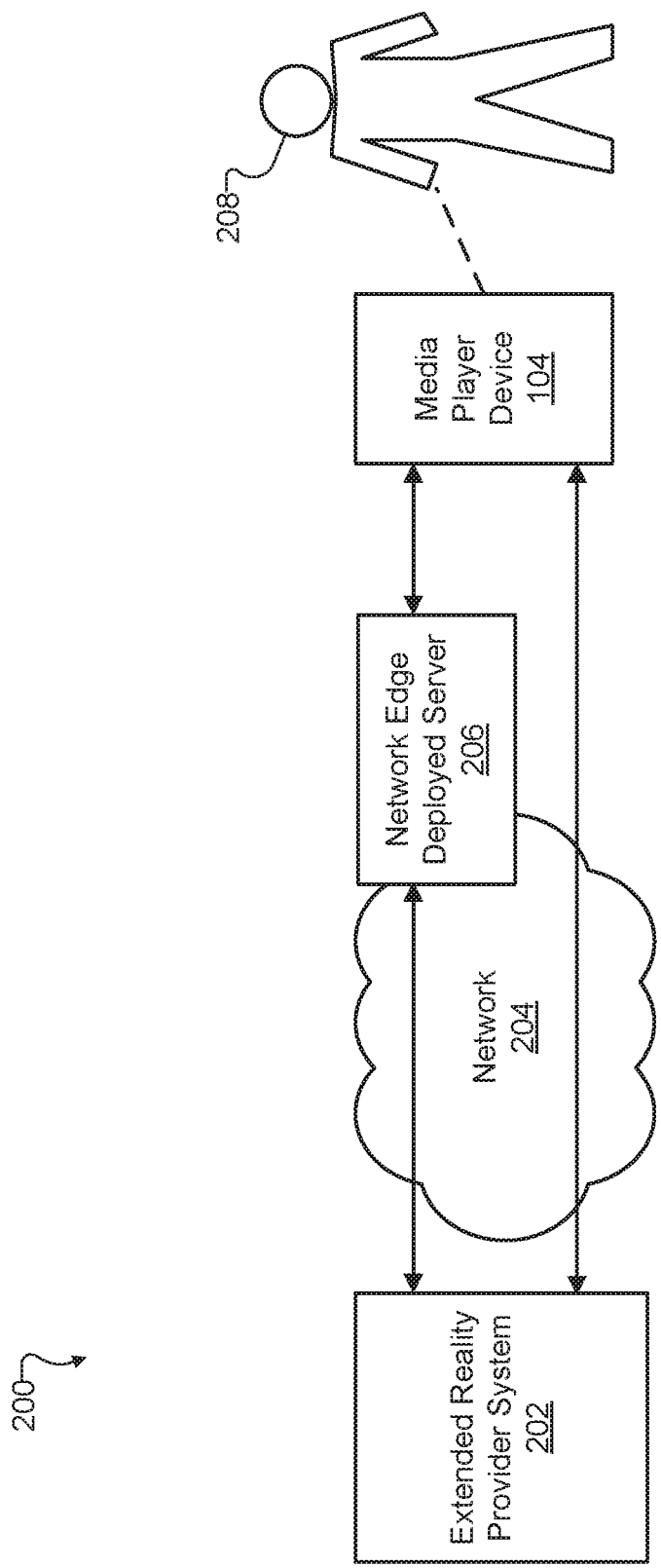
FIG. 2 illustrates an exemplary configuration within which the directional occlusion system of FIG. 1 may be implemented and/or configured to operate according to principles described herein.

FIG. 2 illustrates an exemplary configuration 200 within which system 100 may be implemented and/or configured to operate. For example, as shown, configuration 200 includes an extended reality provider system 202, a network 204, a network-edge-deployed server 206 and media player device 104 (described above) each selectively and communicatively coupled together. Additionally, FIG. 2 shows that a user 208 is associated with media player device 104 (e.g., using media player device 104 to engage in an extended reality experience provided by system 100).

System 100 may be implemented by the elements of configuration 200 in any suitable manner. For example, extended reality provider system 202, network-edge-deployed server 206, a combination of both of these, or another system separate from media player device 104 (e.g., a cloud computing system or server) may implement object modeling system 102, while network 204 may implement the communicative interface employed by (but not necessarily included in) system 100 for communication between object modeling system 102 and media player device 104. In other examples, certain operations described above as being performed by object modeling system 102 may be performed by media player device 104, just as certain operations described above as being performed by media player device 104 may be performed by other elements of configuration 200 or by elements not explicitly shown. Each element depicted in configuration 200 will now be described in more detail.

Extended reality provider system 202 may be implemented by one or more computing devices or components managed and maintained by an entity that creates, generates, distributes, and/or otherwise provides extended reality media content to extended reality users such as user 208. For example, extended reality provider system 202 may include or be implemented by one or more server computers maintained by an extended reality provider. Extended reality provider system 202 may provide video and/or audio data representative of an extended reality world to media player device 104.

Network 204 may provide data delivery between server-side extended reality provider system 202 and client-side devices such as media player device 104 and other media player devices of other users (not shown in FIG. 2). In order to distribute extended reality media content from provider systems to client devices, network 204 may include a provider-specific wired or wireless network (e.g., a cable or satellite carrier network, a mobile telephone network, a traditional telephone network, a broadband cellular data network, etc.), the Internet, a wide area network, a local area network, a content delivery network, and/or any other suitable network or networks. Extended reality media content may be distributed using any suitable communication technologies implemented or employed by network 204. Accordingly, data may flow between extended reality provider system 202 and media player device 104 using any communication technologies, devices, media, and protocols as may serve a particular implementation.

Media player device 104 may be implemented in any suitable form to facilitate the experiencing of an extended reality world by user 208 and to perform the operations described above. For example, one exemplary implementation of media player device 104 may include components such as a video display (e.g., one or more video display screens), an audio rendering system, a game controller for facilitating control of the extended reality experience by user 208, and/or any other components as may serve a particular implementation. In certain examples, the video display of media player device 104 may be configured to be worn on the head and to present video to the eyes of user 208, whereas, in other examples, a handheld or stationary device (e.g., a smartphone or tablet device, a television screen, a computer monitor, etc.) may be configured to present the video instead of the head-worn video display. The audio rendering system of media player device 104 may include stereo headphones integrated with a head-worn video display, an array of loudspeakers (e.g., in a surround sound configuration), or the like. The game controller of media player device 104 may be implemented as a physical controller held and manipulated by user 208 in certain implementations. In other implementations, no physical controller may be employed, but, rather, user control may be detected by way of head turns of user 208, hand or other gestures of user 208, or in other suitable ways.

Network-edge-deployed server 206 may include one or more servers and/or other suitable computing systems or resources that may interoperate with media player device 104. In some examples, network-edge-deployed server 206 may be closely coupled with media player device 104 (e.g., directly coupled or coupled with a relatively small number of intermediate network elements between them) such that there may be a low latency (i.e., a small delay) for data to travel from media player device 104 to network-edge-deployed server 206, be processed on network-edge-deployed server 206, and return in processed form to media player device 104. Accordingly, while a longer latency may exist between extended reality provider system 202 and media player device 104, the latency between network-edge-deployed server 206 and media player device 104 may be low enough to allow for the real-time offloading of various tasks otherwise performed by media player device 104. In some examples, network-edge-deployed server 206 may leverage mobile edge or multiple-access edge computing ("MEC") technologies to enable computing capabilities at the edge of a cellular network (e.g., a 5G cellular network in certain implementations, or any other suitable cellular network associated with any other generation of technology in other implementations). In other examples, network-edge-deployed server 206 may be even more localized to media player device 104, such as by being implemented by computing resources on a same local area network with media player device 104 (e.g., by computing resources located within a home or office of user 208), or the like.

Figure 3B:
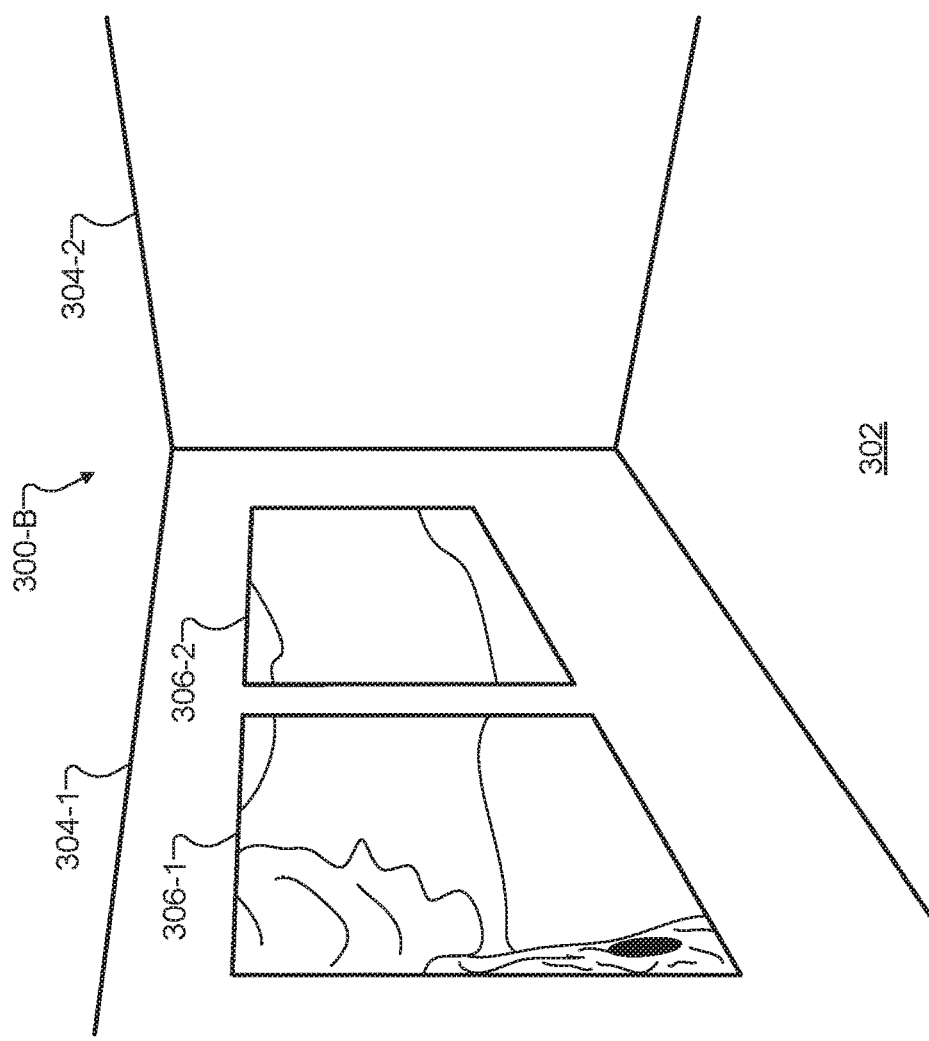
FIG. 3B illustrates a perspective view of the exemplary 3D scene of FIG. 3A according to principles described herein.
Figure 3A:
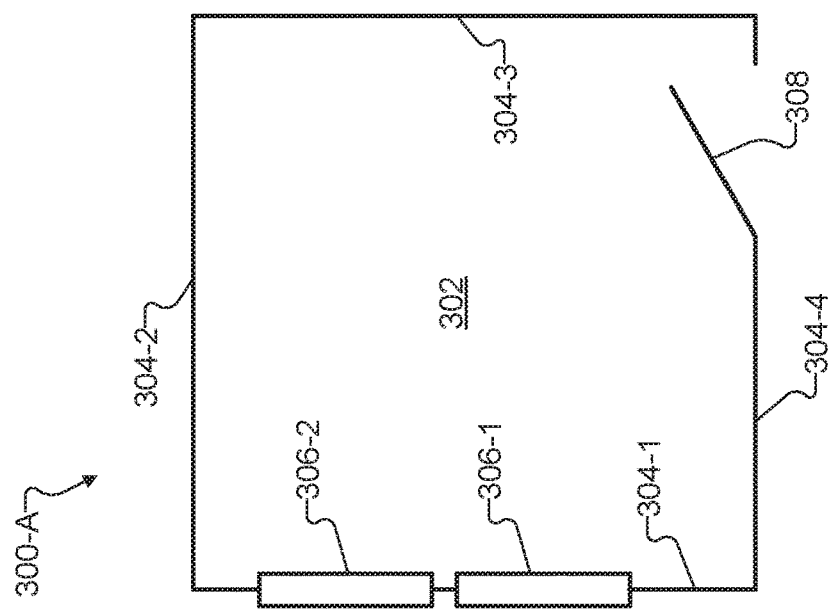
FIG. 3A illustrates a top view of an exemplary 3D scene within which a virtual object is to be integrated according to principles described herein.

FIG. 3A illustrates a top view 300-A of an exemplary 3D scene 302 within which a virtual object is to be integrated, while FIG. 3B illustrates a perspective view 300-B of 3D scene 302. As shown in FIGS. 3A and 3B, 3D scene 302 may be a relatively small or simple 3D scene in certain examples (e.g., a single room or other small space). In other examples, however, it will be understood that a 3D scene may include a larger or more complex space. For instance, various 3D scenes may be implemented as indoor or outdoor spaces that include well-defined or loosely-defined boundaries, that are predefined or dynamically defined as the user moves to new areas of the world, that include one or more subspaces (e.g., different rooms that a user can move between, etc.), and so forth. As mentioned above, media player device 104 may be configured to provide one or more different types of extended reality experiences to user 208 including, for example, augmented reality experiences, virtual reality experiences, and so forth. Accordingly, in certain examples, 3D scene 302 may be a real-world environment within which user 208 is physically located as he or she engages in an augmented reality experience. In other examples, 3D scene 302 may be a virtual world within which user 208 is virtually located (i.e., in which a virtual avatar of user 208 is located) as he or she engages in a virtual reality experience. In still other examples, 3D scene 302 may include or be implemented as any suitable combination of real and virtual scenery associated with any type of extended reality technology as may serve a particular implementation.

As depicted in views 300-A and 300-B of FIGS. 3A and 3B, 3D scene 302 may include four walls 304 that define boundaries of the scene (i.e., walls 304-1 through 304-4, only two of which are visible in perspective view 300-B), two large windows 306 that allow in sunlight to illuminate 3D scene 302 while providing a view of the outdoors (i.e., windows 306-1 and 306-2), and a door 308 to the room (not visible in perspective view 300-B). While color is not explicitly shown in views 300-A, it will be understood, for reasons that will be described in more detail below, that walls 304 may be painted a red color, that the floor and carpet may be a gray color, and that white sunlight streaming in through windows 306 may be the only light illuminating the room during daytime hours described in the examples herein. As such, and as will be described in more detail below, ambient light originating from the left-hand side of the room (i.e., from windows 306) may be relatively bright, white light, while ambient light originating from the other sides of the room (e.g., from walls 304-2 through 304-4) may be less bright, red or gray light that has reflected off the red walls and/or the gray ceiling or floor.

As will be shown and described in the examples below, one or more virtual objects may be rendered by a video display of media player device 104 in such a manner that the virtual objects appear to user 208 to be integrated into 3D scene 302. For example, such virtual objects may be rendered to appear realistically integrated into 3D scene 302 by casting shadows and being shaded in a manner that accounts for how ambient light of different colors and intensities, and originating from different directions, should properly interact with each surface point of the respective surfaces of the virtual objects.

Various potential use cases may be served by the integrating of virtual objects into 3D scene 302 in the manner described herein. For example, in one exemplary augmented reality use case, virtual furniture objects (e.g., virtual representations of real furniture items available for purchase from a particular furniture store) may be rendered to allow user 208 to preview how the furniture objects would look in a real-world room under different lighting conditions (e.g., when the sun is bright at midday, when the sun is dimmer at sunrise or sunset, at night when the sun has set and the room is illuminated by different artificial lights, etc.). As another exemplary use case, virtual objects added to virtual reality worlds (e.g., worlds associated with virtual reality games, virtual reality entertainment programs, virtual reality representations of real-world events such as sporting or musical events or the like, etc.) may be rendered to look highly realistic to thereby make the virtual reality world as immersive as possible.

Figure 4B:
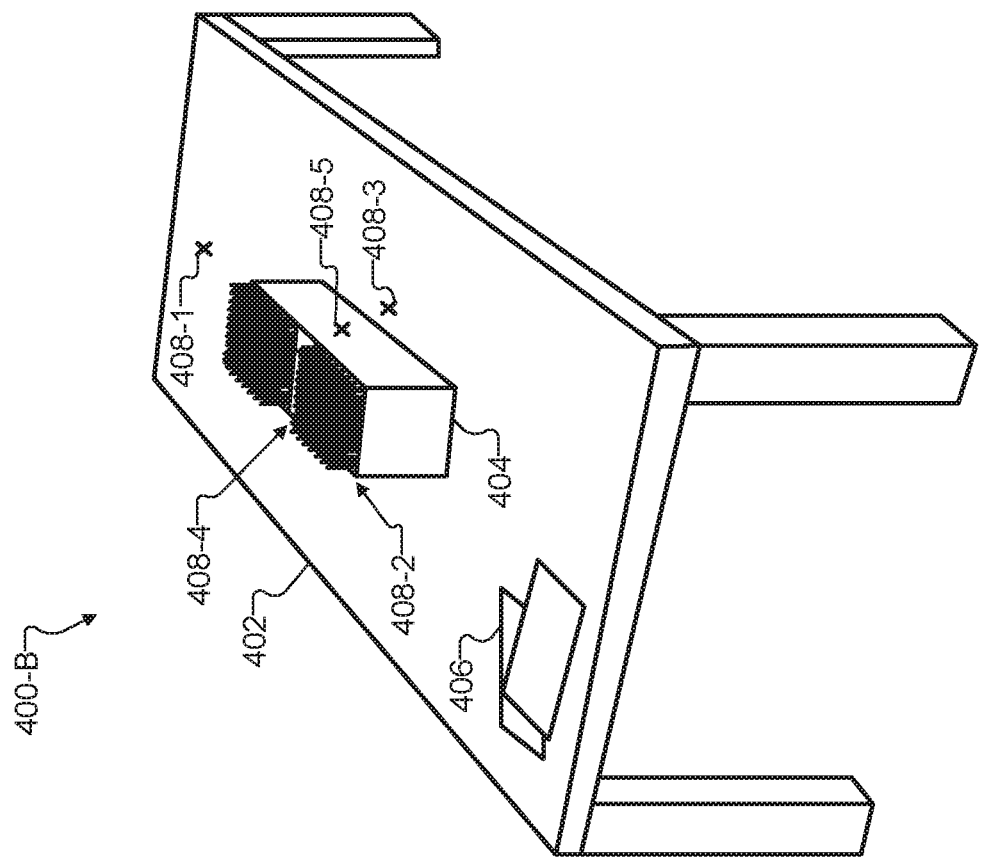
FIG. 4B illustrates a perspective view of the exemplary virtual object of FIG. 4A according to principles described herein.
Figure 4A:
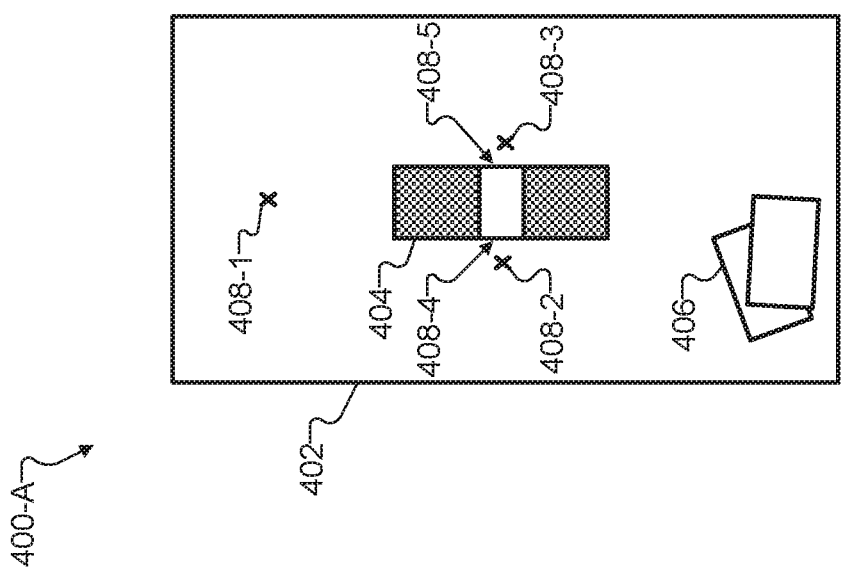
FIG. 4A illustrates a top view of an exemplary virtual object that is to be integrated into the 3D scene of FIGS. 3A and 3B according to principles described herein.

To illustrate an exemplary virtual object that may be presented within 3D scene 302, FIG. 4A shows a top view 400-A of an exemplary virtual object 402 that is to be integrated into 3D scene 302, while FIG. 4B shows a perspective view 400-B of virtual object 402. Specifically, as shown, virtual object 402 is a table object upon which a decoration 404 (e.g., a potted grass centerpiece) and a stack of magazines 406 is placed. In this example, it will be understood that virtual object 402 refers to the combination of the table object together with the decoration and magazine objects shown to be placed on the table. As such, virtual object 402 may include or be implemented by a large number of surface points that together make up a surface of virtual object 402.

In FIGS. 4A and 4B, a few exemplary surface points 408 (e.g., surface points 408-1 through 408-5) are explicitly called out and labeled with small Xs and reference number callouts. Specifically, one exemplary surface point 408-1 is called out on the horizontal tabletop of the table object somewhat apart from decoration 404. Two surface points 408-2 and 408-3 are called out on the tabletop of the table object close to either side of the base of decoration 404 (e.g., close enough that decoration 404 has a significant effect on ambient light that reaches surface points from different directions). Additionally, two surface points 408-4 and 408-5 are called out on opposing vertical surfaces of decoration 404 (surface point 408-4 will be understood to be across from surface point 408-5 on the opposite vertical surface of decoration 404 even though surface point 408-4 is not explicitly visible from the viewpoints provided by views 400-A or 400-B). As will be described in more detail below, directional occlusion methods and systems described herein may operate to provide advanced and highly realistic-looking shading for each of surface points 408, as well as for other surface points on the surface of virtual object 402 that are not explicitly called out in FIGS. 4A and 4B, when virtual object 402 is rendered so as to appear to be integrated into a 3D scene such as 3D scene 302.

A model of virtual object 402 may include any suitable data defining or describing virtual object 402 (including decoration 404 and/or magazines 406) and/or the surface and individual surface points thereof. Additionally, the model of virtual object 402 may be accessed (e.g., obtained) for rendering by system 100 in any suitable way. In certain implementations, for instance, a model of virtual object 402 may include structural data defining the structural geometry of virtual object 402 (e.g., a wire-frame model of various polygons that collectively form the shape of virtual object 402), as well as texture data defining the color and textural geometry of the surface of the object's structure. System 100 may access the model of virtual object 402 (e.g., including the structural and texture data, as well as any other data such as metadata that may be used to represent and define the object) by retrieving the model from a memory or storage facility of system 100 (e.g., from one of storage facilities 106 or 110), by receiving the model from another system communicatively coupled to system 100 (e.g., from an extended reality content provider system, etc.), by generating the model (e.g., based on camera-captured scenery from the real world, based on user input, etc.), or by any other method as may serve a particular implementation.

Once the model of virtual object 402 has been accessed in one of these ways or another suitable way, system 100 may, as mentioned above, determine and store a respective set of directional occlusion values for each surface point of the plurality of surface points on the surface of virtual object 402. Specifically, for example, system 100 may determine and store different directional occlusion value sets for each surface point 408 explicitly labeled and called out in FIGS. 4A and 4B. In certain examples, it may provide certain coding or other efficiencies, or may be otherwise convenient, for system 100 to store these respective sets of directional occlusion values as part of the texture data defining the surface points within the model.

To illustrate, FIG. 5 shows exemplary texture data 500 of virtual object 402 and that is representative of respective directional occlusion value sets for surface points 408 on the surface of virtual object 402. As used herein, an occlusion value may refer to a value associated with a surface point on the surface of an object (e.g., a virtual object such as virtual object 402) and representative of the extent to which the surface point is occluded or exposed to light (e.g., ambient light) in the environment. Occlusion values may be determined, defined, or assigned in any suitable manner. For example, occlusion values may be determined, defined, or assigned to a given surface point based on raytracing techniques whereby a sum of simulated light rays emerging from the surface point and traveling in many directions is taken. Simulated light rays that do not intersect with another surface for at least a predetermined distance may indicate that the surface point is exposed to light in the environment, while simulated light rays that do quickly intersect with other surfaces (e.g., within the predetermined distance) may indicate that the surface point is occluded from light in the environment. Thus, for example, an occlusion value for the surface point may be defined as (or derived based on) a ratio between the simulated light rays that do and do not intersect with other surfaces within the predetermined distance.

To illustrate with a specific example, a hollow tube object may be considered. Surface points on an outer surface of the tube may have low occlusion values (i.e., because these points have a relatively high degree of exposure to ambient light in the environment), while surface points inside the tube may have higher and higher occlusion values the deeper the surface points are into the tube (i.e., because the surface points deeper into the tube become increasingly occluded from the ambient light in the environment). While in this example, high occlusion values indicate high degrees of occlusion while low values indicate low degrees of occlusion, it will be understood that, in other examples, the opposite may be true. That is, high occlusion values may instead represent high degrees of exposure (i.e., low degrees of occlusion) while low occlusion values may instead represent low degrees of exposure (i.e., high degrees of occlusion).

As has been described, directional occlusion methods and systems described herein relate not only to occlusion values as they have been described, but relate, more particularly, to respective sets of directional occlusion values for each surface point. As used herein, a set of directional occlusion values may refer to a set of several complementary occlusion values that each represent the exposure or occlusion to ambient light only in a general direction, rather than in all possible directions, as described above. For example, if it is assumed that ambient light does not originate from the virtual object itself, then each surface point on the virtual object may receive light from any direction in a 180° by 180° hemisphere above the surface point, and a non-directional occlusion value (such as described above) may represent a total exposure to light from any of those directions. In contrast, a particular directional occlusion value may represent an exposure to ambient light only from certain directions, such as from one-third of the hemisphere (e.g., a 90° by 120° sector of the hemisphere in one exemplary implementation that implements three complementary directional occlusion values per surface point). Returning to the example of the hollow tube, for instance, each directional occlusion value in each set of directional occlusion values for surface points on the external surface of the tube may still be relatively low since the points may be unoccluded from all directions in the 180° by 180° hemisphere over each point. However, surface points inside the tube may be associated with sets of directional occlusion values that include both lower values (for directions generally facing out of the tube toward the light) and higher values (for directions generally facing into the tube where minimal ambient light reaches).

System 100 may determine respective sets of directional occlusion values for surface points 408 in any suitable way. For example, system 100 may determine (e.g., using ray-tracing techniques or the like) a percentage of virtual light rays, out of a plurality of virtual light rays that originate from the particular surface point and travel within a respective sector of 3D space, that encounter another surface within a predetermined distance of the particular surface point. This percentage may then be assigned as the directional occlusion value, or the directional occlusion value may otherwise be derived based on that percentage (e.g., as the inverse of that percentage, rounded to a discrete value from a finite set of discrete values, etc.). The relevant sector of 3D space for which virtual light rays are taken into account for a particular directional occlusion value may be determined based on a radiosity basis used for a particular implementation. For example, if the radiosity basis used to determine respective sets of directional occlusion values for surface points 408 includes three equally spaced directions, each respective sector of 3D space over which the virtual light rays are taken into account for a particular directional occlusion value may be a sector of 3D space associated with the particular surface point and associated with a particular direction of the set of three directions defined by the radiosity basis.

Figure 6:
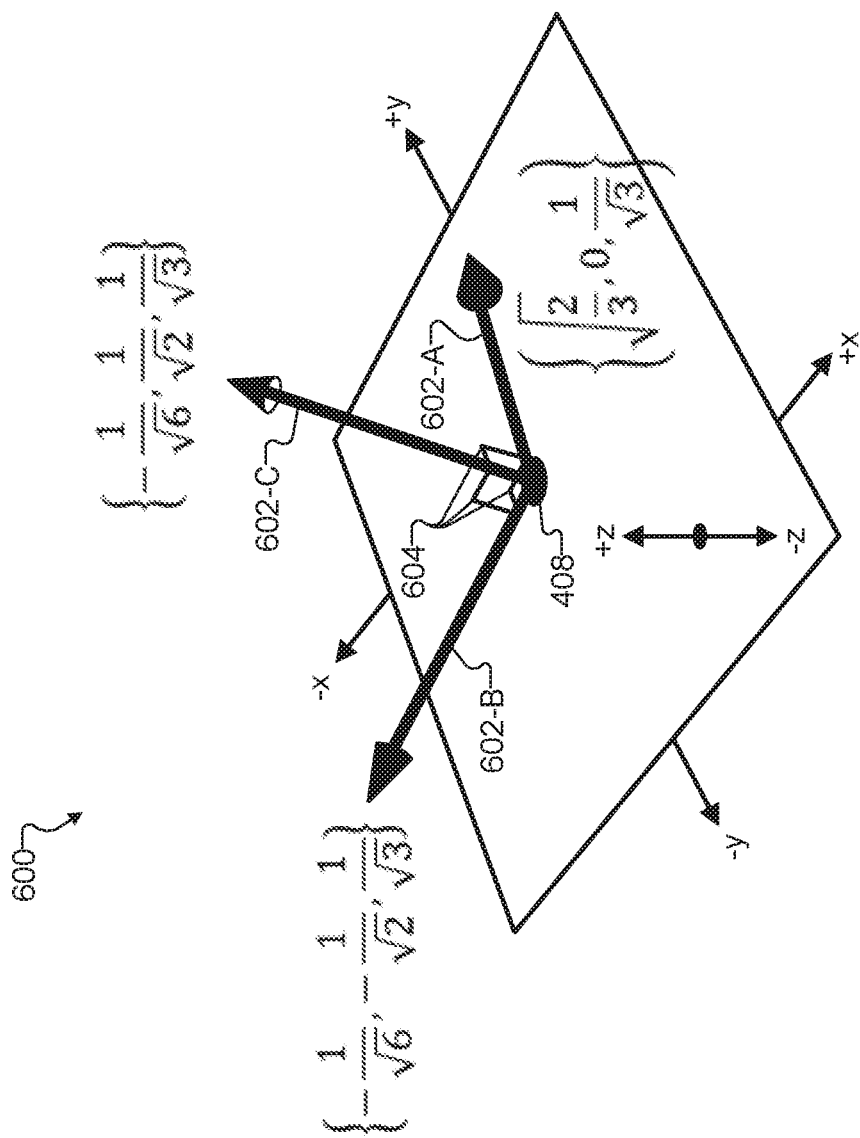
FIG. 6 illustrates an exemplary radiosity basis defining a set of directions from which ambient light may approach a particular surface point according to principles described herein.

To illustrate, FIG. 6 shows an exemplary radiosity basis 600 defining a set of three general directions from which ambient light may approach a particular surface point 408. For example, directions associated with each of three vectors 602 (e.g., vectors 602-A, 602-B, and 602-C) of radiosity basis 600 may correspond to respective thirds of a hemisphere above surface point 408 (e.g., three 90° by 120° segments of the hemisphere, each segment centered around one of vectors 602). As used herein, a radiosity basis refers to a vector basis (e.g., the combination of vectors 602) that is configured for use in representing incoming ambient light from different directions so that data representative of the light may be stored (e.g., as texture data 500 as will be described in more detail below). As shown in FIG. 6, a radiosity basis may include a plurality of vectors 602 that are orthogonal to, and linearly independent from, one another to fully cover a coordinate system that is convenient to store within a texture data structure. While FIG. 6 illustrates radiosity basis 600 including three orthogonal vectors, it will be understood that any suitable plurality of two or more vectors may be used in certain implementations.

As illustrated in FIG. 6, the set of directions defined by radiosity basis 600 includes three directions that, when applied to a particular surface point 408, each satisfy certain conditions. Specifically, as shown, each direction associated with each vector 602 originates from the particular surface point 408 and extends outward away from the surface (shown in FIG. 6 as a square that represents the virtual object). Additionally, as illustrated by respective orthogonal indicators 604, each direction is orthogonal to both other directions in the set of directions. Moreover, each direction is directed at an equal angle with respect to an axis normal to the particular surface point 408. To depict this, FIG. 6 references an exemplary coordinate system with an origin at surface point 408 and with respective coordinate axes in the +/−x, +/−y, and +/−z directions labeled. As shown, each vector 602 is labeled as a unit vector within this coordinate system and each unit vector is directed in a particular direction that is equally spaced with respect to the axis normal to the particular surface point 408 (i.e., the z axis of this coordinate system). Specifically, as shown, vector 602-A points along the +x axis to a point at $\{\text{sqrt}(2/3), 0, 1/\text{sqrt}(3)\}$; vector 602-B points to a point in the −x/−y quadrant at $\{-1/\text{sqrt}(6), -1/\text{sqrt}(2), 1/\text{sqrt}(3)\}$; and vector 602-C points to a point in the −x/+y quadrant at $\{-1/\text{sqrt}(6), 1/\text{sqrt}(2), 1/\text{sqrt}(3)\}$.

Returning to FIG. 5, system 100 may determine, for each surface point 408 (as well as for other surface points of virtual object 402), a respective set of directional occlusion values that includes a "Directional Occlusion Value A" (an "A value") in the direction of vector 602-A, a "Directional Occlusion Value B" (a "B value") in the direction of vector 602-B, and a "Directional Occlusion Value C" (a "C value) in the direction of vector 602-C. Radiosity basis 600 may be oriented in a known and predetermined way for each possible "normal" (i.e., each possible direction in which a line orthogonal to a tangent plane of the surface point may be directed) that a surface point on a virtual object may have. For example, for the vertical normal that is orthogonal to the horizontal tabletop of virtual object 402 (i.e., the normal associated with each of surface points 408-1, 408-2, and 408-3), it may be assumed that radiosity basis 600 is oriented such that vector 602-A generally points toward the right-hand edge of the table as the table is oriented in FIG. 4A, whereas vectors 602-B and 602-C generally point toward the bottom-left and top-right corners of the table, respectively. In other words, referring to the XYZ coordinate system set forth in FIG. 6, the +x direction may point toward the right-hand edge of the table, the −x direction may point to the left-hand edge of the table, the +z direction may point up (i.e., straight out of the table), and so forth.

Based on this exemplary orientation, texture data 500 indicates that the set of directional occlusion values determined for surface point 408-1 includes A, B, and C values each equal to 0%. This indicates, as shown in FIGS. 4A and 4B, that there is nothing nearby surface point 408-1 in any direction that would significantly occlude ambient light from reaching the surface point. In contrast, texture data 500 indicates that the respective sets of directional occlusion values determined for surface points 408-2 and 408-3 include certain non-zero values because these surface points are near decoration 404, which may occlude ambient light from certain directions. Specifically, for surface point 408-2, ambient light from the direction of vector 602-A (i.e., light coming from the right) may be significantly occluded by the walls of decoration 404, thereby giving surface point 408-2 an A value of 70%. Meanwhile, ambient light from the directions of vectors 602-B and 602-C (i.e., light coming from the left) may not be significantly occluded by any other surfaces, thereby giving surface point 408-2 B and C values of 0%. For surface point 408-3 on the other side of decoration 404, it is the ambient light from the direction of vector 602-A (i.e., light coming from the right) that is not occluded by decoration 404, thereby giving surface point 408-3 an A value of 0%. Meanwhile, ambient light from the directions of vectors 602-B and 602-C (i.e., light coming from the bottom-left and top-left, respectively) is significantly occluded by the walls of decoration 404 (although not to the same degree as if these vectors pointed directly to the left). As such, B and C values determined for surface point 408-3 are shown to be 45%.

Surface points 408-4 and 408-5 are associated with different normals than surface points 408-1 through 408-3 (which are all on the same horizontal tabletop). Specifically, surface point 408-4 has a normal parallel to the tabletop and pointing to the left side of the table, while surface point 408-5 has a normal parallel to the tabletop and pointing to the right side of the table. For each of these surface points, radiosity basis 600 may thus be oriented in a different manner (i.e., different from each other and from surface points 408-1 through 408-3). Based on the orientation of radiosity basis 600 predefined for these normals, A, B, and C values for the respective sets of directional occlusion values for surface points 408-4 and 408-5 may each be determined in a similar manner as described above for surface points 408-1 through 408-3. For example, as shown, the sets of directional occlusion values for surface points 408-4 and 408-5 similarly have a mix of zero and non-zero directional occlusion values due to the presence of the tabletop in certain directions from these surface points (e.g., downward directions) and the absence of occluding surfaces in other directions (e.g., upward directions).

Each of the directional occlusion values for each surface point of virtual object 402 may be stored within texture data 500 together with other data defining colors, textures, and other characteristics of the surface points (not explicitly shown in FIG. 5). In some examples, it may be convenient and efficient to employ data structures and paradigms already in place for storing such colors and textures when storing the directional occlusion values. For instance, for a three-direction radiosity basis such as radiosity basis 600, it may be convenient and efficient to store the three A, B, and C values in each respective directional occlusion value set using red, green, and blue ("RGB") channels available in the texture data structure, even though these values describe directional occlusion and not colors. In other examples, other approaches and paradigms may be used for the data storage as may serve a particular implementation.

As mentioned above, one major advantage of the directional occlusion methods and systems described herein is that the respective sets of directional occlusion values may be determined and stored for a particular virtual object prior to when the virtual object is being rendered. Performing the raytracing and/or other operations described above for determining each directional occlusion value may require significant computing resources, and may thus be impractical or impossible to perform at render time using the computing resources that may be available (e.g., from media player device 104). Accordingly, it may be highly beneficial to determine the directional occlusion values ahead of time using computing resources (e.g., such as those provided by object modeling system 102). By storing the predetermined or prerendered directional occlusion values for virtual object 402 within texture data 500, the directional occlusion properties of virtual object 402 may be handled similarly to other texture properties of virtual object 402, requiring minimal dynamic computation at render time to accurately render virtual object 402.

For example, when media player device 104 is tasked with rendering virtual object 402 so as to appear to be integrated within 3D scene 302 (e.g., by accurately shading the surface of virtual object 402), media player device 104 may not need to perform any real-time raytracing for the surface points, but rather may simply shade the surface points based on the prerendered sets of directional occlusion values stored in the texture data and a relatively straightforward lookup of the ambient light coming from each direction of the radiosity basis (e.g., from a set of directional irradiance maps as described in more detail below) for a given normal of each surface point. More particularly, to shade a particular surface point 408, system 100 (e.g., media player device 104) may calculate the irradiance or brightness of the surface point 408 as the average of the products of the directional occlusion value and the directional irradiance data for each direction in the radiosity basis. For example, for surface point 408-3, 100% of whatever light is coming from the direction of vector 602-A (since 0% of the light is occluded according to the A value), 55% of whatever light coming from the direction of vector 602-B (since the rest of the light is occluded according to the B value), and 55% of whatever light is coming from the direction of vector 602-C (since the rest of the light is occluded according to the C value) are averaged together to determine the irradiance of surface point 408-3, or how bright surface point 408-3 is to be rendered.

The directional irradiance data for a particular direction (i.e., how much ambient light is coming from that direction) may be looked up from a particular directional irradiance map that is associated with the particular direction and is included in a set of directional irradiance maps that includes a different directional irradiance map for each direction defined by a radiosity basis (e.g., three directional irradiance maps for the three directions illustrated by vectors 602 in FIG. 6, for this particular example).

Figure 7:
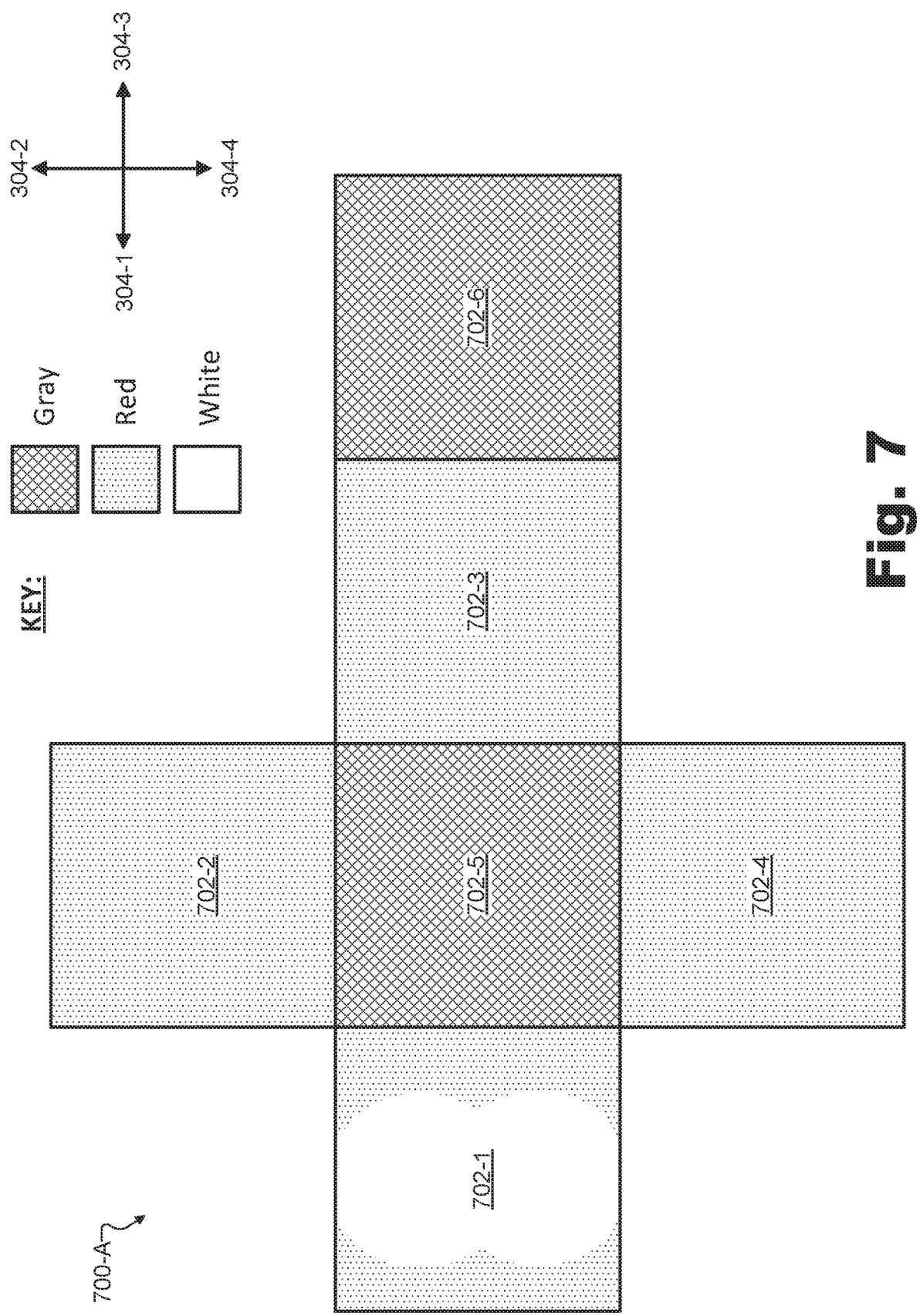
FIG. 7 illustrates an exemplary directional irradiance map from a set of directional irradiance maps that each include irradiance data representative of ambient light in the 3D scene of FIGS. 3A and 3B according to principles described herein.

To illustrate, FIG. 7 shows an exemplary directional irradiance map 700-A from a set of directional irradiance maps that each include irradiance data representative of ambient light in 3D scene 302. As used herein, an irradiance map refers to a representation of irradiance (e.g., ambient light received by a surface per unit area) for each possible normal that a surface may have in a 3D scene. For example, an irradiance map may be implemented as a data structure (e.g., a cube map such as illustrated in FIG. 7 or another suitable shape or structure) that indicates, for each normal, a summation of all the incoming ambient light originating from every angle for that normal. To do this, certain assumptions and simplifications may be made for convenience in certain implementations. For instance, ambient light may be modeled as originating infinitely far away and may be modeled so as not to attenuate between surfaces at different places within a 3D scene. Accordingly, any surface point within a given 3D scene that has the same normal (e.g., that is facing the same direction), may be assumed to be illuminated by the same ambient light in the same way. For example, as mentioned above, each of surface points 408-1 through 408-3, while in different places on the tabletop, have the same normal and thus would be assumed to be illuminated by the same type and amount of ambient light before occlusion is taken into account.

As shown in FIG. 7, an irradiance map such as directional irradiance map 700-A may be stored as a cube map that can be represented (as shown) as an unfolded or deconstructed cube having a face 702-1 on the left, a face 702-2 facing forward, a face 702-3 on the right, a face 702-4 facing backward, a face 702-5 on bottom, and a face 702-6 on top. The KEY in FIG. 7 illustrates how this cube may be oriented with respect to walls 304 of 3D scene 302. Specifically, as shown, face 702-1 corresponds to wall 304-1, face 702-2 corresponds to wall 304-2, face 702-3 corresponds to wall 304-3, and face 702-4 corresponds to wall 304-4. Faces 702-5 and 702-6 correspond to the floor and ceiling of 3D scene 302, respectively. As such, the basic colors indicated by the key and the different shading styles in FIG. 7 indicate that irradiance originating from wall 304-1 is a mix of white light (e.g., direct sunlight from windows 306) and red light (e.g., sunlight reflecting from paint on wall 304-1), irradiance originating from walls 304-2 through 304-4 is largely red light (e.g., sunlight reflecting from paint on these walls), and irradiance originating from the floor and ceiling is largely gray light (e.g., sunlight or a lack thereof reflecting from these surfaces).

Because a cube, when folded, completely encloses a volume, a cube-based irradiance map represents respective irradiance values for every possible normal that any object within that volume could have. For example, a point in the center of face 702-6 may correspond to the normal of surface points 408-1 through 408-3 on the tabletop of virtual object 402 (which each face straight up), a point in the center of face 702-1 may correspond to the normal of surface point 408-4 on the left side of decoration 404 (which faces directly to the left), a point in the center of face 702-3 may correspond to the normal of surface point 408-5 on the right side of decoration 404 (which faces directly to the right), and so forth for every normal that faces at any angle within a 3D space.

A global irradiance map such as has been described may take into account, for each normal, a summation of all the light that affects that normal regardless of the direction from which that light originates. Directional irradiance map 700-A, however, may be implemented not as a global irradiance map, but, rather, as a directional irradiance map. In contrast to a global irradiance map, a directional irradiance map does not account for light from all directions, but, rather, accounts only for light from certain directions. Specifically, directional irradiance map 700-A will be understood to correspond with vector 602-A of radiosity basis 600, and to represent, for each normal, a summation of all the light originating from directions associated with vector 602-A (i.e., originating from a third of a hemisphere associated with vector 602-A, as described above). As such, while only directional irradiance map 700-A is explicitly shown in FIG. 7, it will be understood that directional irradiance map 700-A is included as part of a set of directional irradiance maps 700 that also includes a directional irradiance map 700-B corresponding to vector 602-B and a directional irradiance map 700-C corresponding to vector 602-C. Accordingly, in generating this set of directional irradiance maps 700, system 100 may create the set to include a separate irradiance cube map for each direction of the set of directions defined by radiosity basis 600.

As mentioned above with respect to virtual object 402, every potential normal that a surface point can have may be associated with a different orientation of radiosity basis 600. Accordingly, a radiosity basis transform function may be used to determine how radiosity basis 600 is oriented for any particular normal (i.e., which global direction with respect to 3D scene 302 each vector 602 points for that particular normal). This transform function may be configured such that similar normals (e.g., normals for neighboring surface points on a curved surface) may orient radiosity basis 600 in a similar way for the sake of continuity.

Additionally or alternatively, in certain implementations, a single irradiance map may be generated by way of which the light contribution for each direction in radiosity basis 600 is looked up directly rather than based on the normal of each particular surface point. For example, rather than generating the irradiance maps by integrating incident light over a full hemisphere associated with each normal, this type of irradiance map may be generated by integrating over a smaller portion of the hemisphere (e.g., a conic portion equal to one-third of a sphere as one particular example). Advantageously, this type of irradiance map is not dependent on any particular radiosity basis that is predefined (e.g., such as radiosity basis 600) and allows for the model of the virtual object to be easily rotated. Additionally, it may be simpler and faster (e.g., requiring less computing power and/or processing time) to generate this type of irradiance map. However, it will be understood that the shading for this type of irradiance map may not be as accurate as for an implementation, as described above, in which the irradiance map integrates the incident light for the full hemisphere for each normal. In that type of implementation, only ambient light in the hemisphere specified by the surface normal are accounted for and no ambient light originating from below the surface plane. Conversely, in this approach, all ambient light within a region near a direction may be considered including ambient light originating from below the surface plane. As such, some amount of "bleeding" light color data may be included in the irradiance value used for a surface point. Consequently, for any particular implementation, the approach used to generate irradiance maps may be selected in a manner that takes into account these various advantages and tradeoffs.

As mentioned above, system 100 may perform the generating of the set of directional irradiance maps 700 independently from the determining and storing of the respective sets of directional occlusion values for a given virtual object such as virtual object 402. For example, the determining and storing of the respective sets of directional occlusion values for surface points 408 may be performed prior to and independently from the generating of the set of directional irradiance maps 700, and the respective sets of directional occlusion values may not be affected by (e.g., dependent on)

ambient light present within 3D scene 302 (i.e., the ambient light represented by directional irradiance maps 700). By bifurcating these tasks in this way, various efficiency benefits may arise, as have been described.

The independent generation of directional irradiance maps 700 may be performed in any suitable manner. For example, directional irradiance maps 700 may be generated for a 3D scene that has static lighting prior to render time (e.g., concurrently with or at a different time than the determining of the directional occlusion values). For example, a virtual 3D scene set in an indoor room may have constant lighting such that static directional irradiance maps may be predetermined. In other examples, directional irradiance maps 700 may be generated for a 3D scene with more dynamic lighting such as a real-world environment where light naturally changes as light switches are flipped on and off, as the sun comes out and then is covered by clouds, and so forth. In these examples, system 100 may be configured to dynamically and regularly update the set of directional irradiance maps 700 such that the set of directional irradiance maps continuously represents the ambient light in the 3D scene as the ambient light in the 3D scene changes in time. For example, system 100 may include a dedicated server and a 360° camera in the 3D scene (e.g., each of which may be included within object modeling system 102) that continuously operate to keep the set of directional irradiance maps 700 up to date as the lighting in the scene changes. For example, the updates may occur on an as-needed basis (e.g., when system 100 detects that the lighting has changed) or at a particular periodic rate (e.g., several times per second, once per minute, etc.).

As media player device 104 renders virtual object 402, each particular surface point 408 may be shaded based on the respective set of directional occlusion values stored for the surface point in texture data 500 as well as based on directional irradiance values looked up in the set of directional irradiance maps 700 provided (e.g., by object modeling system 102). Specifically, as mentioned above, the shading for each particular point may be based on an average of whatever ambient light originates from each direction defined by radiosity basis 600 to the extent that the light is not occluded in that direction. In this way, the shading for each surface point 408 may be efficiently determined (e.g., without heavy real-time processing such as real-time ray-tracing or the like) such that, when rendered by a display depicting 3D scene 302, virtual object 402 will appear to be integrated into 3D scene 302 and to be shaded and illuminated in a realistic, true-to-life manner.

Figure 8B:
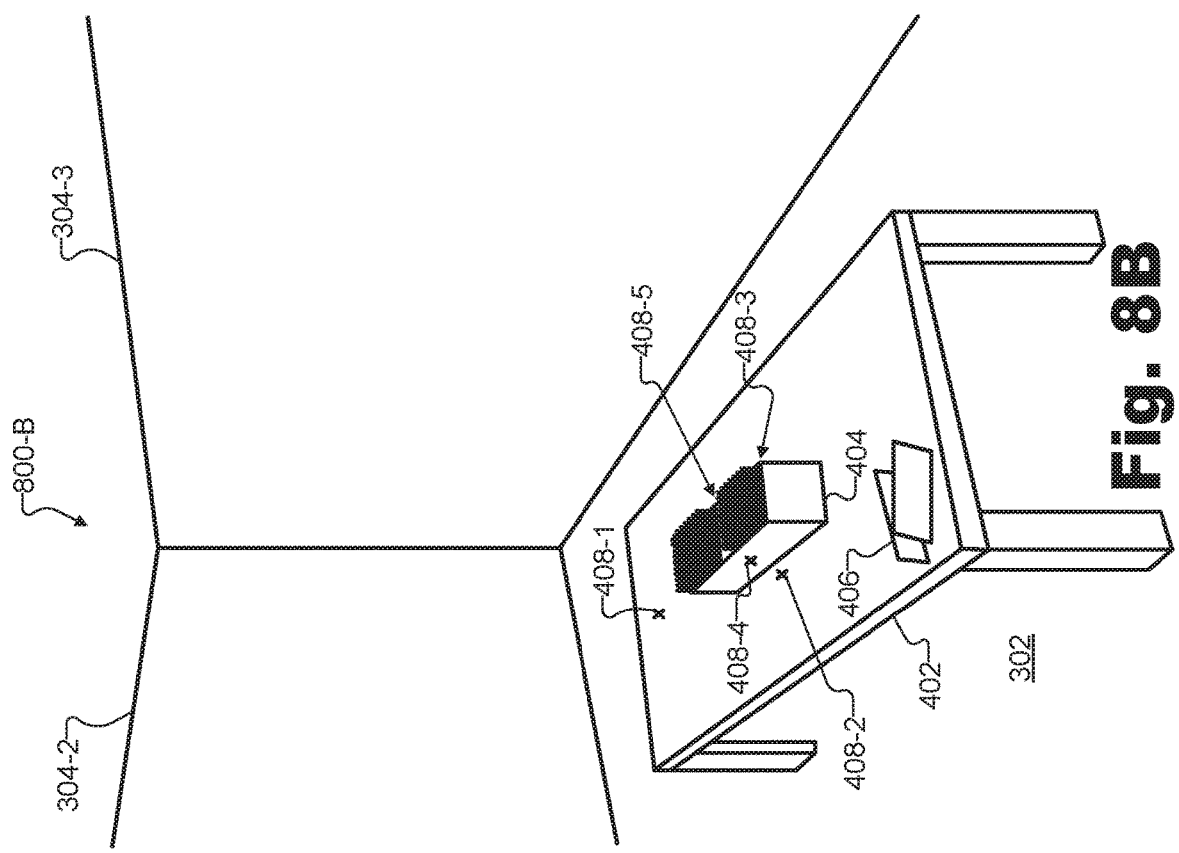
FIG. 8B illustrates a second perspective view of the rendering of FIG. 8A according to principles described herein.
Figure 8A:
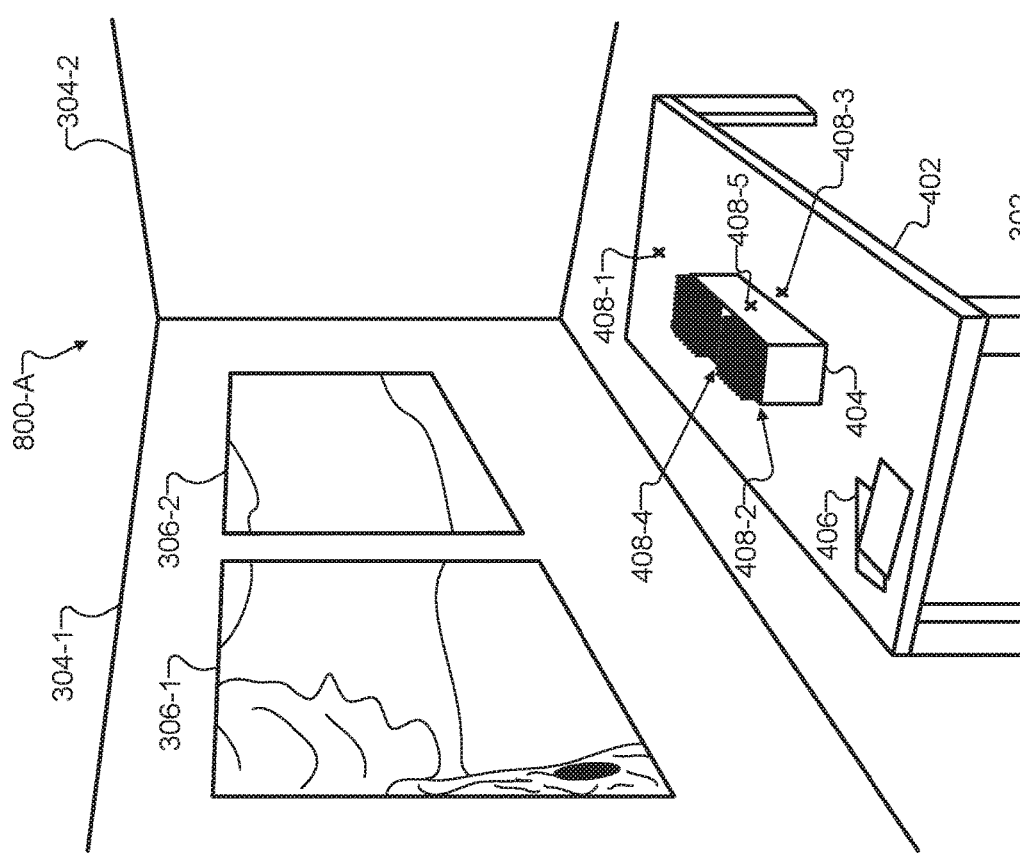
FIG. 8A illustrates a first perspective view of a rendering of the virtual object of FIGS. 4A and 4B such that the virtual object appears to a user to be integrated into the 3D scene of FIGS. 3A and 3B according to principles described herein.

To illustrate, FIG. 8A shows a first perspective view 800-A of a rendering of virtual object 402 such that virtual object 402 appears to a user to be integrated into 3D scene 302, and FIG. 8B shows a second perspective view 800-B of the rendering of FIG. 8A to show virtual object 402 and 3D scene 302 from an alternate angle. As shown, virtual object 402 is shown to be integrated into 3D scene 302 as if the object is a real object actually present in the scene and illuminated by the ambient light of the scene. View 800-A shows a clear perspective of surface points 408-3 and 408-5, as well as wall 304-1 (with windows 306). In contrast, while these surface points and this wall are not visible in view 800-B, view 800-B shows a clear perspective of surface points 408-2 and 408-4, as well as wall 304-3. While shading of respective surface points 408 is not explicitly illustrated in FIGS. 8A and 8B, details of the shading of each of these surface points will be described below.

In order to render virtual object 402 to appear to be integrated into 3D scene 302, system 100 may calculate direct shadows cast by and/or onto virtual object 402 by other object occluding point sources of light such as a light bulb, the sun, or the like. Once such shadows are accounted for, system 100 may then apply shading in accordance with the methods and systems described herein (e.g., based on directional occlusion values for each surface point and directional irradiance maps accounting for respective normals of the surface points). More specifically, the rendering of virtual object 402 by media player device 104 may include rendering shadows generated by occlusion of one or more point sources of light providing light to 3D scene 302. For example, the shadows may include shadows cast onto the virtual object by other objects included in 3D scene 302 and/or shadows cast onto other objects included in 3D scene 302 by virtual object 402. The rendering of virtual object 402 may further include rendering, subsequent to the rendering of the shadows, surface shading generated by occlusion of the ambient light in 3D scene 302. For example, the surface shading may be applied to each surface point of the plurality of surface points on the surface of the virtual object. More specifically, after any shadows have been applied to surface points 408 (for the sake of simplicity, no point sources of light or direct shadows are shown in this example), each surface point 408 may be shaded to account for how dark the shading should be, what color the shading should be, and so forth, as follows. The shading of each surface point 408 in accordance with the methods and systems described herein will now be described.

For surface point 408-1, media player device 104 receives texture data 500 indicating that surface point 408-1 is not occluded significantly in any direction (i.e., A, B, and C values of the set of directional occlusion values are all 0%). Additionally, media player device 104 looks up an irradiance value for each direction in the set of directional irradiance maps 700 received to find that whitish-gray-colored ambient light of a medium intensity is to illuminate surface point 408-1 from the window side, while a reddish-gray-colored ambient light of a medium intensity is to illuminate surface point 408-1 from the side of wall 304-3. Media player device 104 therefore shades surface point 408-1 with an appropriate color and intensity; in this case, a medium-intensity shade of mixed color (e.g., gray with elements of white and red).

For surface point 408-2, media player device 104 receives texture data 500 indicating that surface point 408-2 is not occluded significantly in the direction of windows 306 (i.e., the B and C values are both 0%), but is significantly occluded in the direction of red wall 304-3 (i.e., the A value is 70%). Additionally, media player device 104 looks up an irradiance value for each direction in the set of directional irradiance maps 700 received to find that a whitish-gray-colored ambient light of a medium intensity is to illuminate surface point 408-2 from the window side, while a reddish-gray-colored ambient light of a medium intensity is to illuminate surface point 408-2 from the side of wall 304-3. While the whitish-gray irradiance in the general direction of the window is not occluded at all, the reddish-gray irradiance in the direction of wall 304-3 is highly occluded. Accordingly, media player device 104 shades surface point 408-2 with an appropriate color and intensity; in this case, a medium-intensity whitish-gray shade that is slightly lower in intensity than the shade used for surface point 408-1.

For surface point 408-3, media player device 104 receives texture data 500 indicating that surface point 408-3 is not occluded significantly in the direction of red wall 304-3 (i.e., the A value is 0%) while it is somewhat occluded in the general direction of windows 306 (i.e., the B and C values are both 45%). Additionally, media player device 104 looks up an irradiance value for each direction in the set of directional irradiance maps 700 received to find that, as with surface points 408-1 and 408-2, the same whitish-gray-colored ambient light of a medium intensity is to illuminate surface point 408-3 from the window side, while the same reddish-gray-colored ambient light of a medium intensity is to illuminate surface point 408-3 from the side of wall 304-3. In contrast to surface point 408-2, however, the whitish-gray irradiance in the general direction of windows 306 is somewhat occluded for surface point 408-3, while the reddish-gray irradiance in the direction of wall 304-3 is not occluded at all. Accordingly, media player device 104 shades surface point 408-3 with an appropriate color and intensity; in this case, a medium-intensity reddish-gray shade that is slightly lower in intensity than the shade used for surface point 408-1.

Surface point 408-4 has a different normal than surface points 408-1 through 408-3. As such, the radiosity transform function may be used to reorient radiosity basis 600 and determine that vector 602-A points generally in the direction of wall 304-1 and the ceiling, while vectors 602-B and 602-C point generally in the direction of wall 304-1 and different corners of the floor (i.e., such that the +z axis labeled in FIG. 6 would point to the left). Thus, as media player device 104 analyzes texture data 500, the data may indicate, based on this orientation of radiosity basis 600, that surface point 408-4 is not occluded significantly in the direction of the ceiling (i.e., the A value is 0%) while it is somewhat occluded in the general direction of the floor (i.e., the B and C values are both 45%). Additionally, media player device 104 looks up an irradiance value for each direction in the set of directional irradiance maps 700 received to find that a whitish-red-colored ambient light of a high intensity is to illuminate surface point 408-4 from each direction. Accordingly, media player device 104 shades surface point 408-4 with an appropriate color and intensity; in this case, a high-intensity whitish-red shade that is higher in intensity than the shades used for surface points 408-1 through 408-3 but that may be slightly lower than shades used for surface points higher up on the side of decoration 404 (i.e. so as to be less occluded than surface point 408-4 by the table).

Surface point 408-5 has yet a different normal than all the other surface points 408 described above. As such, the radiosity transform function may again be used to reorient radiosity basis 600 and determine that vector 602-A points generally in the direction of wall 304-3 and the ceiling, while vectors 602-B and 602-C point generally in the direction of wall 304-3 and different corners of the floor (i.e., such that the +z axis labeled in FIG. 6 would point to the right). Thus, as media player device 104 analyzes texture data 500, the data may indicate, based on this orientation of radiosity basis 600, that surface point 408-5 is not occluded significantly in the direction of the ceiling (i.e., the A value is 0%) while it is somewhat occluded in the general direction of the floor (i.e., the B and C values are both 45%). Additionally, media player device 104 looks up an irradiance value for each direction in the set of directional irradiance maps 700 received to find that a red-colored ambient light of a medium intensity is to illuminate surface point 408-5 from each direction. Accordingly, media player device 104 shades surface point 408-5 with an appropriate color and intensity; in this case, a medium intensity red shade that is lower in intensity to the shade used for surface point 408-4 and lower than shades used for surface points higher up on the side of decoration 404 (i.e. so as to be less occluded than surface point 408-5 by the table).

Accordingly, as illustrated by this example, each surface point 408, as well as all the other surface points on the surface of virtual object 402 that are not explicitly called out, may be appropriately and individually shaded with a realistic shading color and intensity that accounts for ambient light and the different directions from which the ambient light originates. Moreover, because it requires relatively little computing power to access the directional occlusion values and ambient light values for calculating the shades, this high degree of realism may be achieved efficiently by a media player device with access to only relatively modest computing resources.

Figure 9:
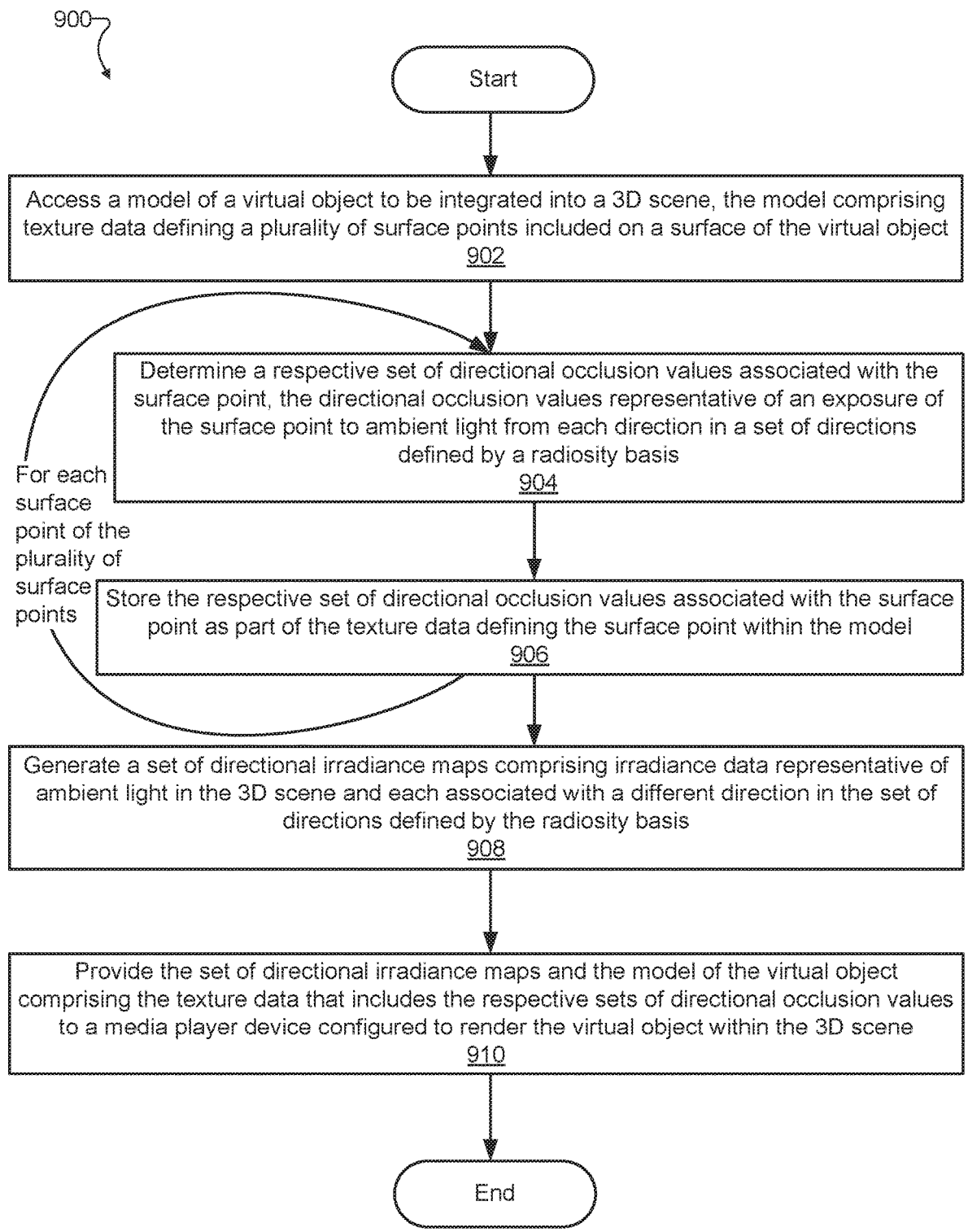
FIG. 9 illustrates a directional occlusion method for performance by an object modeling system to shade a virtual object rendered in a 3D scene according to principles described herein.

FIG. 9 illustrates a directional occlusion method 900 for performance by an object modeling system to shade a virtual object rendered in a 3D scene according to principles described herein. For example, in certain implementations, an embodiment of an object modeling system such as object modeling system 102 or another suitable object modeling system or element of system 100 may be configured to perform method 900. While FIG. 9 illustrates exemplary operations according to one embodiment, other embodiments may omit, add to, reorder, and/or modify any of the operations shown in FIG. 9.

In operation 902, an object modeling system may access a model of a virtual object to be integrated into a 3D scene. In some examples, the model may include texture data defining a plurality of surface points on a surface of the virtual object. Operation 902 may be performed in any of the ways described herein.

For each surface point of the plurality of surface points on the surface of the virtual object, operation 904 and operation 906 may be performed. For example, each surface point may be processed sequentially or in parallel to perform the operations with respect to the particular surface point.

In operation 904, the object modeling system may determine a respective set of directional occlusion values associated with the surface point. In some examples, the directional occlusion values may be representative of an exposure of the surface point to ambient light from each direction of a set of directions defined by a radiosity basis. Operation 904 may be performed in any of the ways described herein.

In operation 906, the object modeling system may store the respective set of directional occlusion values associated with the surface point. For example, the object modeling system may store the set of directional occlusion values as part of the texture data defining the surface point within the model. Operation 906 may be performed in any of the ways described herein.

In operation 908, the object modeling system may generate a set of directional irradiance maps that include irradiance data representative of ambient light in the 3D scene. In some examples, each directional irradiance map in the set of directional irradiance maps may be associated with a different direction of the set of directions defined by the radiosity basis. Operation 908 may be performed in any of the ways described herein.

In operation 910, the object modeling system may provide data to a media player device configured to render the virtual object within the 3D scene for presentation to a user of the media player device. For example, object modeling system may provide to the media player device the set of directional irradiance maps generated in operation 908 and/or the model of the virtual object accessed in operation 902 and that now comprises, after operations 904 and 906, the texture data that includes the respective sets of stored directional occlusion values associated with each surface point of the plurality of surface points. Operation 910 may be performed in any of the ways described herein.

Figure 10:
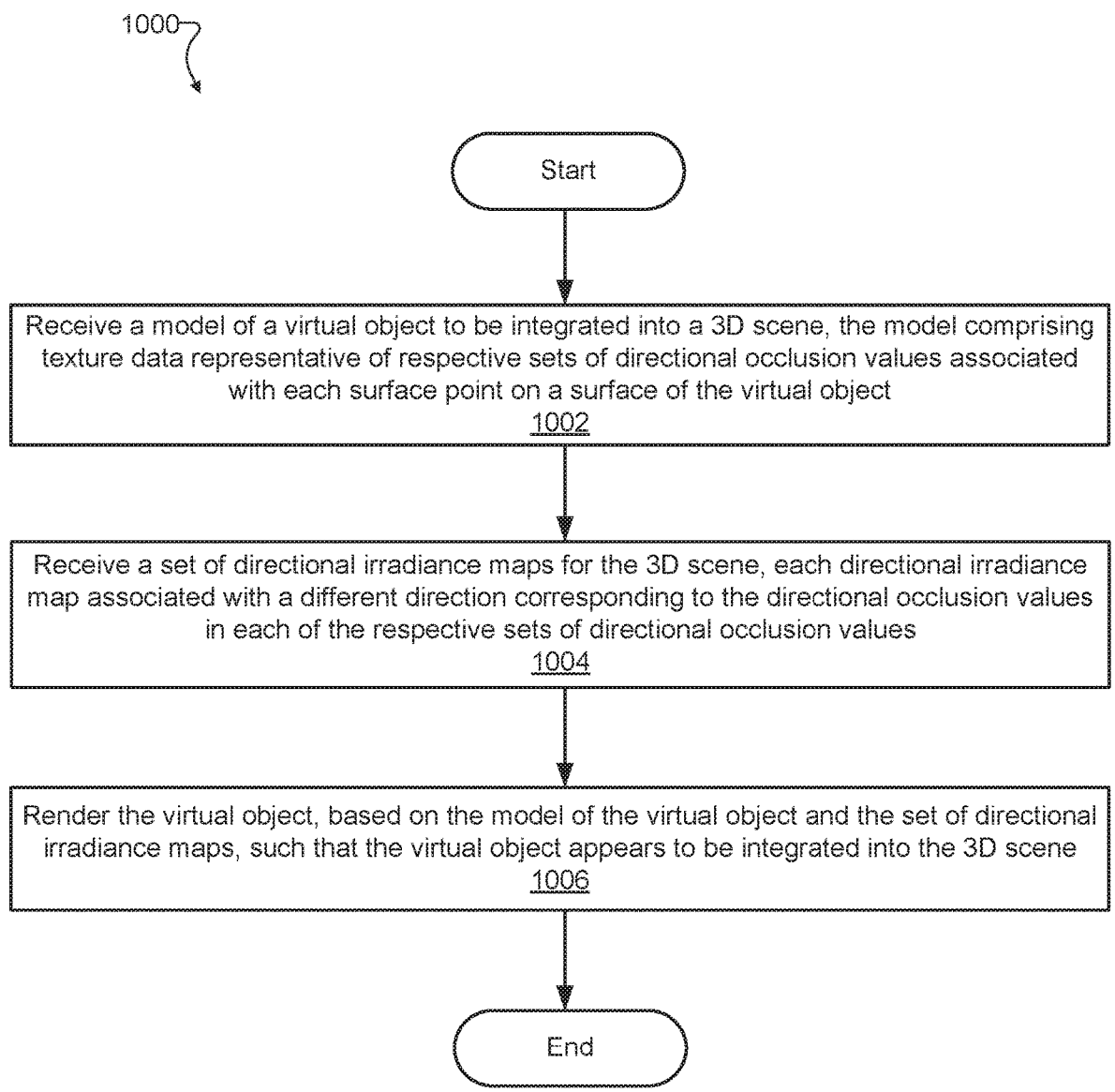
FIG. 10 illustrates a directional occlusion method for performance by a media player device to shade a virtual object rendered in a 3D scene according to principles described herein.

FIG. 10 illustrates a directional occlusion method 1000 for performance by a media player device to shade a virtual object rendered in a 3D scene according to principles described herein. For example, in certain implementations, an embodiment of a media player device such as media player device 104 or another suitable media player device or element of system 100 may be configured to perform method 1000. While FIG. 10 illustrates exemplary operations according to one embodiment, other embodiments may omit, add to, reorder, and/or modify any of the operations shown in FIG. 10.

In operation 1002, a media player device may receive a model of a virtual object from an object modeling system. For example, the received model may be a model of a virtual object that is to be integrated into a 3D scene, and the model may include texture data representative of respective sets of directional occlusion values associated with each surface point of a plurality of surface points on a surface of the virtual object. For each surface point of the plurality of surface points, the directional occlusion values within the respective set of directional occlusion values associated with the surface point may be representative of an exposure of the surface point to ambient light from each direction of a set of directions defined by a radiosity basis. Operation 1002 may be performed in any of the ways described herein.

In operation 1004, the media player device may receive a set of directional irradiance maps for the 3D scene from the object modeling system. In some examples, the set of directional irradiance maps may include irradiance data representative of ambient light in the 3D scene. Each directional irradiance map in the set of directional irradiance maps may be associated with a different direction of the set of directions defined by the radiosity basis. Operation 1004 may be performed in any of the ways described herein.

In operation 1006, the media player device may render the virtual object based on the model of the virtual object received in operation 1002 and the set of directional irradiance maps received in operation 1004. For example, the media player device may render the virtual object such that the virtual object appears, to a user of the media player device, to be integrated into the 3D scene. Operation 1006 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 11:
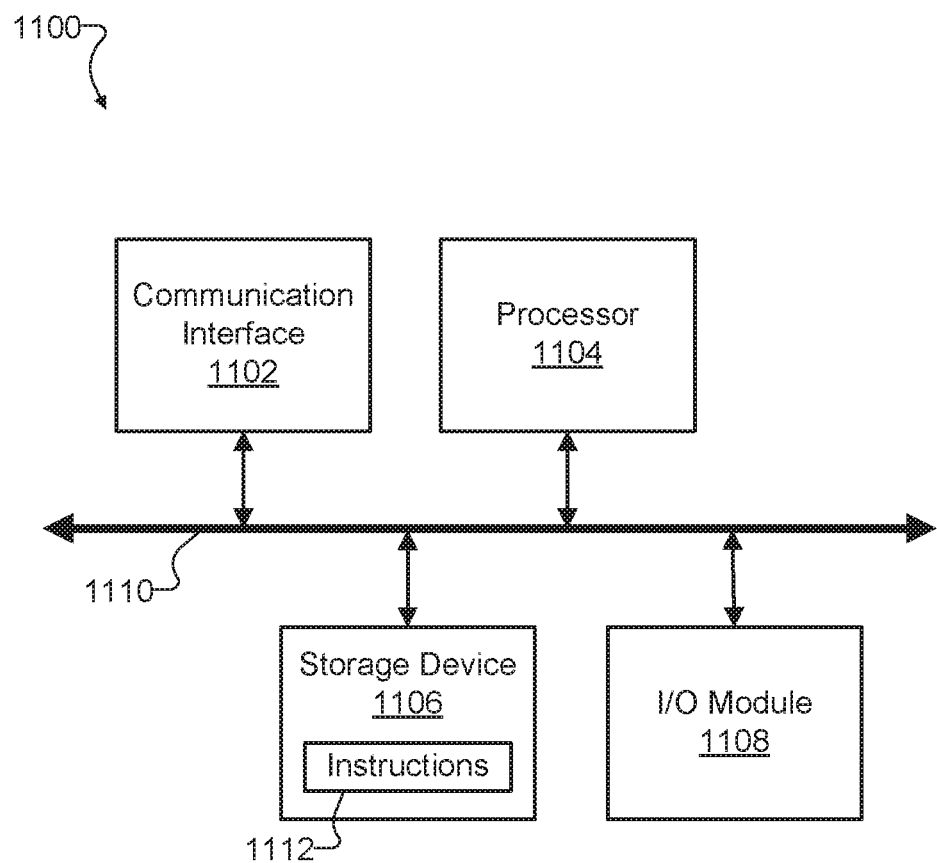
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected one to another via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data and/or interpreting, executing, and/or directing execution of one or more of the instructions, processes, and/or operations described herein. Processor 1104 may perform operations by executing computer-executable instructions 1112 (e.g., an application, software, code, and/or other executable data instance) stored in storage device 1106.

Storage device 1106 may include one or more data storage media, devices, or configurations and may employ any type, form, and combination of data storage media and/or device. For example, storage device 1106 may include, but is not limited to, any combination of the non-volatile media and/or volatile media described herein. Electronic data, including data described herein, may be temporarily and/or permanently stored in storage device 1106. For example, data representative of computer-executable instructions 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the systems, computing devices, and/or other components described herein, including components of system 100, may be implemented by computing device 1100. For example, either or both of storage facility 106 of object modeling system 102 and storage facility 110 of media player device 104 may be implemented by storage device 1106. Likewise, either or both of processing facility 108 of object modeling system 102 and processing facility 112 of media player device 104 may be implemented by processor 1104.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    determining, by an object modeling system, a set of directional occlusion values associated with a surface point on a surface of a virtual object, wherein:
        the directional occlusion values are representative of an exposure of the surface point to ambient light from each direction of a set of directions defined by a radiosity basis, and
        the determining of each directional occlusion value of the set of directional occlusion values includes determining, for a respective sector of three-dimensional ("3D") space associated with the surface point and a particular direction of the set of directions, a percentage of virtual light rays, of a plurality of virtual light rays that originate from the surface point and travel within the respective sector, that encounter another surface within a predetermined distance of the surface point;
    storing, by the object modeling system as part of texture data defining the surface point, the set of directional occlusion values associated with the surface point; and
    providing, by the object modeling system, the texture data that includes the set of stored directional occlusion values associated with the surface point.

2. The method of claim 1, further comprising:
    generating, by the object modeling system, a set of directional irradiance maps each associated with a different direction of the set of directions defined by the radiosity basis; and
    providing, by the object modeling system together with the texture data, the set of directional irradiance maps.

3. The method of claim 2, wherein:
    a model of the virtual object is to be integrated into a 3D scene;
    the set of directional irradiance maps includes irradiance data representative of ambient light in the 3D scene; and
    the generating of the set of directional irradiance maps includes creating a separate irradiance cube map for each direction of the set of directions defined by the radiosity basis.

4. The method of claim 3, further comprising regularly updating the set of directional irradiance maps such that the set of directional irradiance maps is continually representative of the ambient light in the 3D scene as the ambient light in the 3D scene changes in time.

5. The method of claim 2, wherein the determining and storing of the set of directional occlusion values for the surface point is performed prior to and independently from the generating of the set of directional irradiance maps.

6. The method of claim 1, further comprising:
    accessing, by the object modeling system, a model of the virtual object, the model including the texture data defining the surface point and additional texture data defining a plurality of additional surface points on the surface of the virtual object; and
    for each additional surface point of the plurality of additional surface points:
        determining, by the object modeling system, a respective set of directional occlusion values associated with the additional surface point,
        storing, by the object modeling system as part of the additional texture data, the respective set of directional occlusion values associated with the additional surface point, and
        providing, by the object modeling system, the additional texture data that includes the respective set of stored directional occlusion values associated with the additional surface point, the providing of the additional texture data performed as part of providing the model of the virtual object that includes the texture data and the additional texture data.

7. The method of claim 1, wherein the set of directions defined by the radiosity basis includes three directions that, when applied to the surface point:
    each originate from the surface point and extend outward away from the virtual object;
    are each directed at an equal angle with respect to an axis normal to the surface point; and
    are each orthogonal to both other directions in the set of directions.

8. The method of claim 1, wherein the providing of the texture data includes providing the texture data to a media player device configured to render the virtual object within a 3D scene for presentation to a user of the media player device.

9. A system comprising:
    a memory storing instructions; and
    a processor communicatively coupled to the memory and configured to execute the instructions to:
        determine a set of directional occlusion values associated with a surface point on a surface of a virtual object, wherein:
            the directional occlusion values are representative of an exposure of the surface point to ambient light from each direction of a set of directions defined by a radiosity basis, and
            the determining of each directional occlusion value of the set of directional occlusion values includes determining, for a respective sector of three-dimensional ("3D") space associated with the surface point and a particular direction of the set of directions, a percentage of virtual light rays, of a plurality of virtual light rays that originate from the surface point and travel within the respective sector, that encounter another surface within a predetermined distance of the surface point;

store, as part of texture data defining the surface point, the set of directional occlusion values associated with the surface point; and provide the texture data that includes the set of stored directional occlusion values associated with the surface point.

10. The system of claim 9, wherein the processor is further configured to execute the instructions to:

generate a set of directional irradiance maps each associated with a different direction of the set of directions defined by the radiosity basis; and provide, together with the texture data, the set of directional irradiance maps.

11. The system of claim 10, wherein:

a model of the virtual object is to be integrated into a 3D scene;

the set of directional irradiance maps includes irradiance data representative of ambient light in the 3D scene; and the generating of the set of directional irradiance maps includes creating a separate irradiance cube map for each direction of the set of directions defined by the radiosity basis.

12. The system of claim 11, wherein the processor is further configured to execute the instructions to regularly update the set of directional irradiance maps such that the set of directional irradiance maps is continually representative of the ambient light in the 3D scene as the ambient light in the 3D scene changes in time.

13. The system of claim 10, wherein the determining and storing of the set of directional occlusion values for the surface point is performed prior to and independently from the generating of the set of directional irradiance maps.

14. The system of claim 9, wherein the processor is further configured to execute the instructions:

to access a model of the virtual object, the model including the texture data defining the surface point and additional texture data defining a plurality of additional surface points on the surface of the virtual object; and for each additional surface point of the plurality of additional surface points:

to determine a respective set of directional occlusion values associated with the additional surface point, to store, as part of the additional texture data, the respective set of directional occlusion values associated with the additional surface point, and to provide the additional texture data that includes the respective set of stored directional occlusion values associated with the additional surface point, the providing of the additional texture data performed as part of providing the model of the virtual object that includes the texture data and the additional texture data.

15. The system of claim 9, wherein the set of directions defined by the radiosity basis includes three directions that, when applied to the surface point:

each originate from the surface point and extend outward away from the virtual object;

are each directed at an equal angle with respect to an axis normal to the surface point; and are each orthogonal to both other directions in the set of directions.

16. The system of claim 9, wherein the providing of the texture data includes providing the texture data to a media player device configured to render the virtual object within a 3D scene for presentation to a user of the media player device.

17. A non-transitory computer-readable medium storing instructions that, when executed, direct a processor of a computing device to:

determine a set of directional occlusion values associated with a surface point on a surface of a virtual object, wherein:

the directional occlusion values are representative of an exposure of the surface point to ambient light from each direction of a set of directions defined by a radiosity basis, and the determining of each directional occlusion value of the set of directional occlusion values includes determining, for a respective sector of three-dimensional ("3D") space associated with the surface point and a particular direction of the set of directions, a percentage of virtual light rays, of a plurality of virtual light rays that originate from the surface point and travel within the respective sector, that encounter another surface within a predetermined distance of the surface point;

store, as part of texture data defining the surface point, the set of directional occlusion values associated with the surface point; and provide the texture data that includes the set of stored directional occlusion values associated with the surface point.

18. The non-transitory computer-readable medium of claim 17, wherein the instructions further direct the processor to:

generate a set of directional irradiance maps each associated with a different direction of the set of directions defined by the radiosity basis; and provide, together with the texture data, the set of directional irradiance maps.

19. The non-transitory computer-readable medium of claim 17, wherein the set of directions defined by the radiosity basis includes three directions that, when applied to the surface point:

each originate from the surface point and extend outward away from the virtual object;

are each directed at an equal angle with respect to an axis normal to the surface point; and are each orthogonal to both other directions in the set of directions.

20. The non-transitory computer-readable medium of claim 17, wherein the providing of the texture data includes providing the texture data to a media player device configured to render the virtual object within a 3D scene for presentation to a user of the media player device.

* * * * *